(12) United States Patent
Poghosyan et al.

(10) Patent No.: US 10,275,284 B2
(45) Date of Patent: Apr. 30, 2019

(54) DATACENTER RESOURCE ALLOCATION BASED ON ESTIMATED CAPACITY METRIC

(71) Applicant: VMware, Inc., Palo Alto, CA (US)

(72) Inventors: Arnak Poghosyan, Yerevan (AM); Ashot Nshan Harutyunyan, Yerevan (AM); Naira Movses Grigoryan, Yerevan (AM); Khachatur Nazaryan, Yerevan (AM); Ruzan Hovhannisyan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 45 days.

(21) Appl. No.: 15/184,742

(22) Filed: Jun. 16, 2016

(65) Prior Publication Data
US 2017/0364391 A1    Dec. 21, 2017

(51) Int. Cl.
*G06F 9/50* (2006.01)

(52) U.S. Cl.
CPC ............ *G06F 9/5027* (2013.01); *G06F 9/505* (2013.01)

(58) Field of Classification Search
CPC ............................... G06F 9/5027; G06F 9/505
See application file for complete search history.

(56) References Cited

U.S. PATENT DOCUMENTS

| | | | | |
|---|---|---|---|---|
| 6,493,810 B1 * | 12/2002 | Pang | .................. | H04L 67/2852 711/130 |
| 7,720,955 B1 * | 5/2010 | Kelly | .................. | G06F 11/3447 709/223 |
| 7,769,843 B2 * | 8/2010 | Neuse | ................ | G06Q 30/0283 705/400 |
| 8,250,198 B2 * | 8/2012 | Zhang | ................... | G06Q 10/06 709/200 |
| 8,355,938 B2 * | 1/2013 | Gilpin | ............... | G06Q 10/0637 705/7.11 |
| 8,738,414 B1 * | 5/2014 | Nagar | .................. | G06Q 10/103 705/7.12 |
| 9,998,393 B2 * | 6/2018 | Hanis | ...................... | H04L 47/72 |
| 2005/0080696 A1 * | 4/2005 | Bagchi | .................. | G06Q 10/06 705/35 |
| 2006/0206240 A1 * | 9/2006 | Tsui | ....................... | H02J 3/008 700/291 |
| 2008/0167930 A1 * | 7/2008 | Cao | ........................ | G06Q 10/06 705/7.14 |
| 2008/0172312 A1 * | 7/2008 | Synesiou | ............... | G06Q 10/00 705/34 |
| 2009/0164262 A1 * | 6/2009 | Ettl | ........................ | G06Q 10/06 705/7.12 |
| 2012/0221373 A1 * | 8/2012 | Marwah | ................. | G06Q 10/04 705/7.27 |
| 2012/0233328 A1 * | 9/2012 | Iyoob | ..................... | G06F 9/5061 709/226 |

(Continued)

*Primary Examiner* — Benjamin C Wu

(57) ABSTRACT

Methods determine a capacity-forecast model based on historical capacity metric data and historical business metric data. The capacity-forecast model may be to estimate capacity requirements with respect to changes in demand for the data center customer's application program. The capacity-forecast model provides an analytical "what-if" approach to reallocating data center resources in order to satisfy projected business level expectations of a data center customer and calculate estimated capacities for different business scenarios.

24 Claims, 30 Drawing Sheets

(56) References Cited

U.S. PATENT DOCUMENTS

| | | | |
|---|---|---|---|
| 2012/0331135 A1* | 12/2012 | Alon | H04L 41/044 709/224 |
| 2014/0372167 A1* | 12/2014 | Hillier | G06Q 10/06314 705/7.24 |
| 2017/0206591 A1* | 7/2017 | Deshpande | G06Q 10/08345 |

* cited by examiner

DATACENTER RESOURCE ALLOCATION BASED ON ESTIMATED CAPACITY METRIC

TECHNICAL FIELD

The present disclosure is directed to planning for changes in capacity of resources in a data center.

BACKGROUND

Cloud-computing facilities provide computational bandwidth and data-storage services much as utility companies provide electrical power and water to consumers. Cloud computing provides enormous advantages to customers without the devices to purchase, manage, and maintain in-house data centers. Such customers can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, customers can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a customer.

Many data centers use a rata center management product with capacity and project planning tools that provide recommendations based on what-if scenarios. The recommendations provide data center customers with what can be reclaimed and what may or may not fit into the current environment of the physical data center infrastructure. Data center customers may ask questions and receive predictions based on adding or removing hardware capacity and/or by increasing or decreasing workloads in terms of hardware resource utilization. However, data center customers typically want to plan data center capacity requirements in order to meet potential changes in demand for access to their application programs. However, data center management products do not provide such planning capabilities and do not calculate a relationship between changes in usage of the application program and capacity of data center resources. As a result, data center customers have to try and estimate capacity changes due to changes in application program usage based on historical business metric data. For example, a data center customer typically tries to predict potential changes in CPU and memory utilization in the event of an increased number of users of the customer's application program based on historical usage data.

SUMMARY

Methods described herein determine a capacity-forecast model based on historical capacity metric data and historical business metric data in order to estimate capacity requirements with respect to changes in demand for the data center customer's application program. The capacity-forecast model provides an analytical "what-if" approach to reallocating center resources in order to satisfy projected business level expectations of a data center customer. Methods collect capacity metric data and business metric data over a time period. The methods calculate an average capacity metric value in each time window of the time period with a burst spike of capacity metric data, and calculate an average business metric data in the same time windows. The average capacity metric data and average business metric data are normalized. If the normalized capacity metric data and normalized business metric data are correlated, a capacity-forecast model is calculated based on the normalized capacity and business metric data sets. The capacity-forecast model may be used to calculate estimated capacities for different business scenarios.

Based on correlation of extreme behaviors of an application program and different capacities, patterns may be determined in order to address forecasting problems. This historical analysis of extreme spikes and trends in the capacity and business metrics or stresses of relevant indicators reveal relationships between customer application program and data center infrastructure flows. Methods may improve business aspects of a customer's application program without customer investment in the capacity upgrades. Methods may also be used to calculate increases in data center capacity in order to meet future business plans projected by a data center customer. Method may also be used to determine overprovisioned data center capacities for a current state of an application program or business.

DETAILED DESCRIPTION

Figure 1:
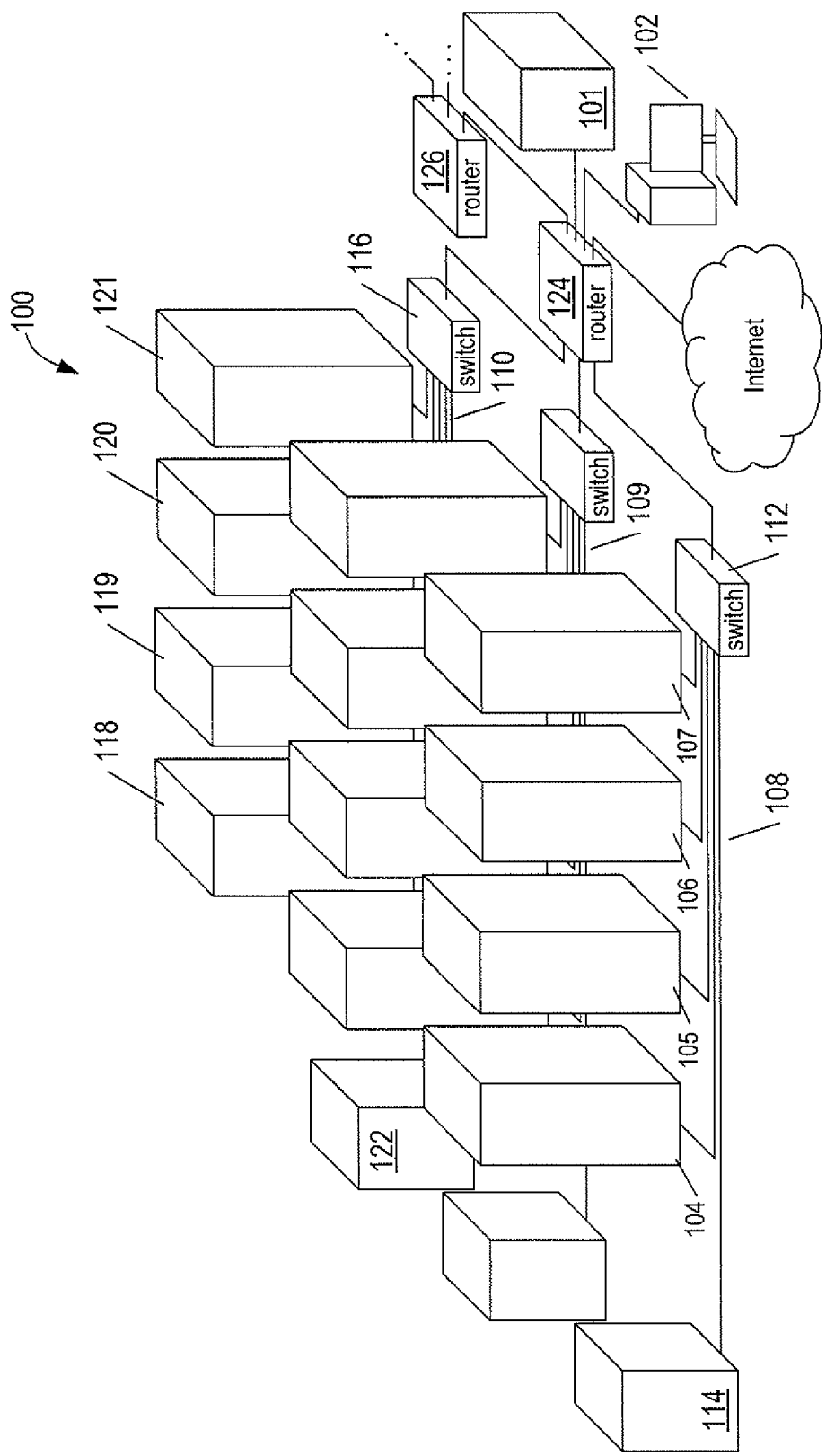
FIG. 1 shows an example of a cloud-computing facility.

FIG. 1 shows an example of a cloud-computing facility 100. The cloud-computing facility 100 consists of a virtualdata-center management server 101 and a PC 102 on which a virtual-data-center management interface may be displayed to system administrators and other users. The cloud-computing facility 100 additionally includes a number of hosts or server computers, such as server computers 104-107, that are interconnected to form three local area networks 108-110. For example, local area network 108 includes a switch 112 that interconnects the four servers 104-107 and a mass-storage array 114 via Ethernet or optical cables and local area network 110 includes a switch 116 that interconnects four servers 118-1121 and a mass-storage array 122 via Ethernet or optical cables. In this example, the cloud computing infrastructure 100 also includes a router 124 that interconnects the LANs 108-110 and interconnects the LANS to the Internet, the virtual-data-center management server 101, the PC 102 and to a router 126 that, in turn, interconnects other LANs composed of server computers and mass-storage arrays (not shown). In other words, the routers 124 and 126 are interconnected to form a larger network of server computers.

Figure 2:
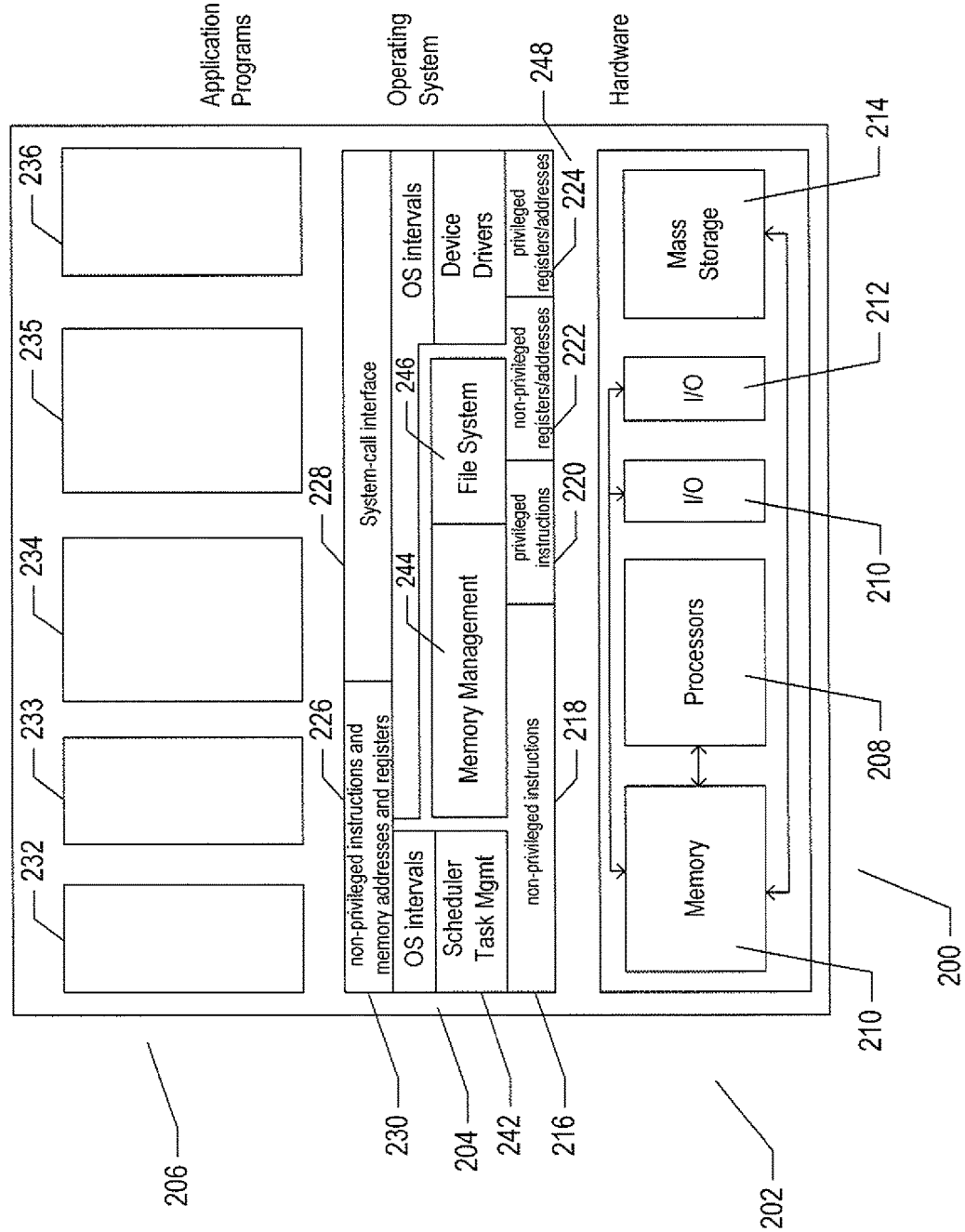
FIG. 2 shows generalized hardware and software components of a server computer.

FIG. 2 shows generalized hardware and software components of a server computer. The server computer 200 includes three fundamental layers: (1) a hardware layer or level 202; (2) an operating-system layer or level 204; and (3) an application-program layer or level 206. The hardware layer 202 includes one or more processors 208, system memory 210, various different types of input-output ("I/O") devices 210 and 212, and mass-storage devices 214. Of course, the hardware level also includes many other components, including power supplies, internal communications links and busses, specialized integrated circuits, many different types of processor-controlled or microprocessor-controlled peripheral devices and controllers, and many other components. The operating system 204 interfaces to the hardware level 202 through a low-level operating system and hardware interface 216 generally comprising a set of non-privileged computer instructions 218, a set of privileged computer instructions 220, a set of non-privileged registers and memory addresses 222, and a set of privileged registers and memory addresses 224. In general, the operating system exposes non-privileged instructions, non-privileged registers, and non-privileged memory addresses 226 and a system-call interface 228 as an operating-system interface 230 to application programs 232-236 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 242, memory management 244, a file system 246, device drivers 248, and many other components and modules.

To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 246 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 3A:
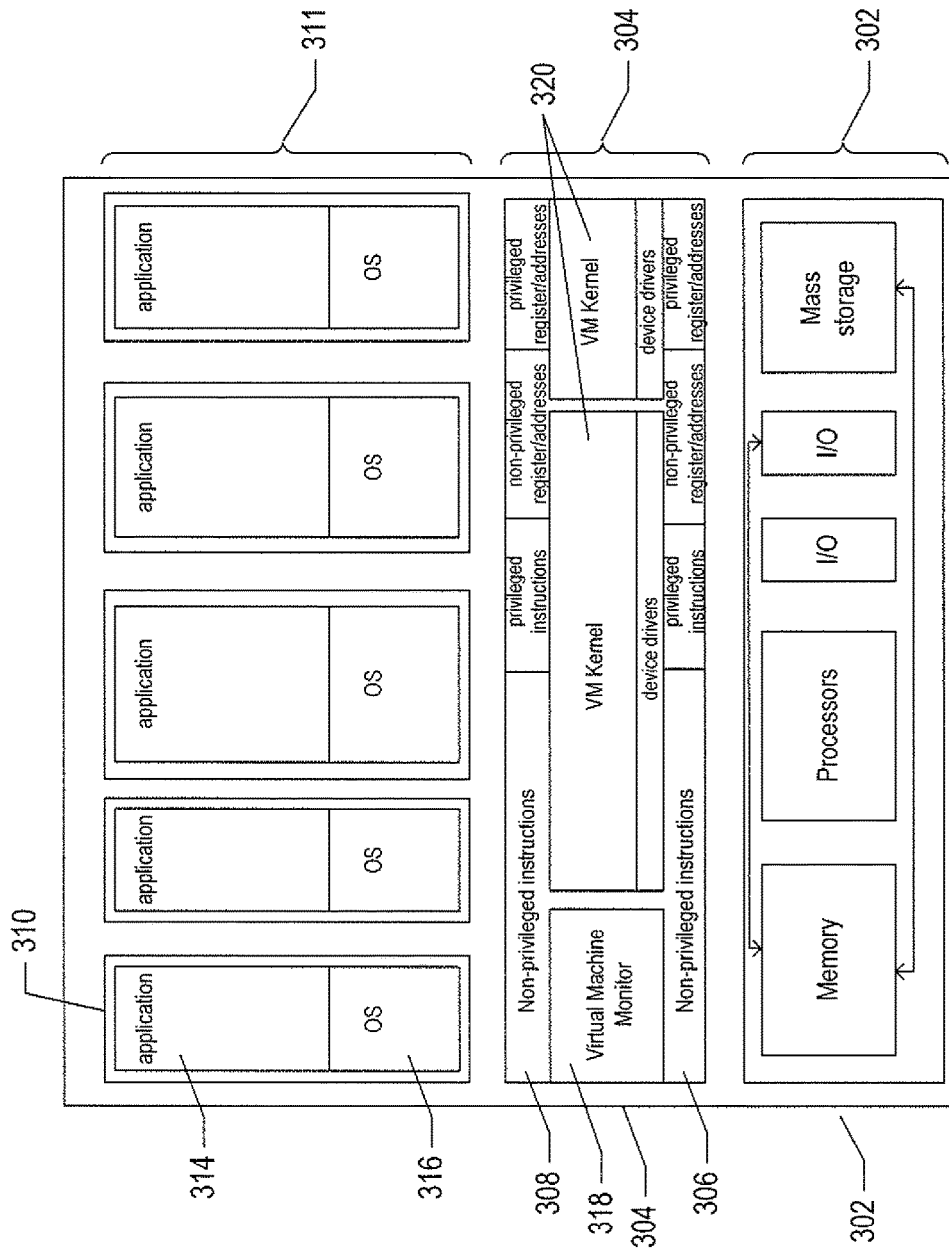
FIGS. 3A-3B show two types of virtual machines and virtual-machine execution environments.
Figure 3B:
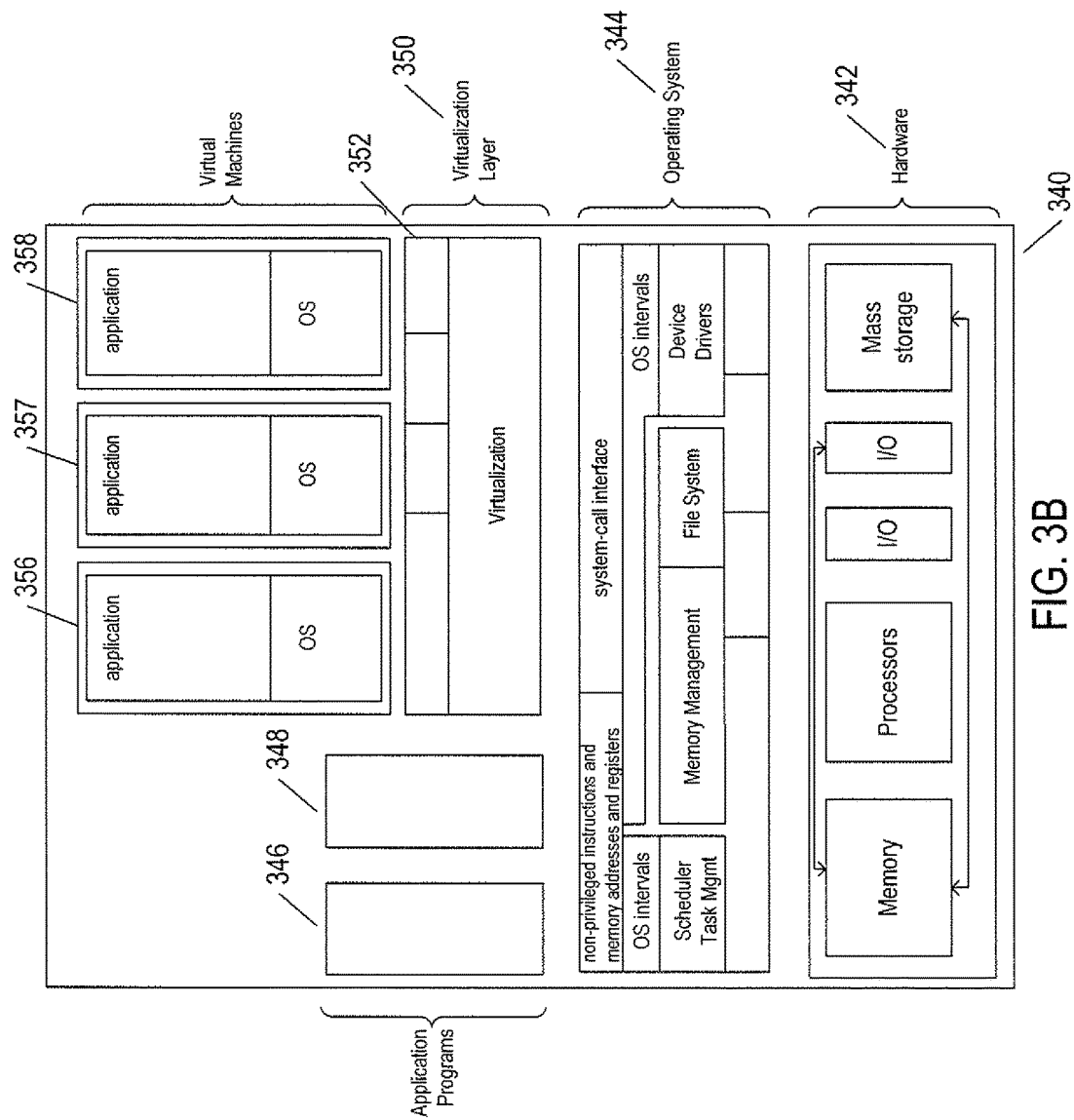

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 3A-3B show two types of VM and virtual-machine execution environments. FIGS. 3A-3B use the same illustration conventions as used in FIG. 2. FIG. 3A shows a first type of virtualization. The server computer 300 in FIG. 3A includes the same hardware layer 302 as the hardware layer 202 shown in FIG. 2. However, rather than providing an operating system layer directly above the hardware layer, as in FIG. 2, the virtualized computing environment shown in FIG. 3A features a virtualization layer 304 that interfaces through a virtualization-layer/hardware-layer interface 306, equivalent to interface 216 in FIG. 2, to the hardware. The virtualization layer 304 provides a hardware-like interface 308 to a number of VMs, such as VM 310, in a virtual-machine layer 311 executing above the virtualization layer 304. Each VM includes one or more application programs or other higher-level computational entities packaged together with an operating system, referred to as a "guest operating system," such as application 314 and guest operating system 316 packaged together within VM 310. Each VM is thus equivalent to the operating-system layer 204 and application-program layer 206 in the general-purpose computer system shown in FIG. 2. Each guest operating system within a VM interfaces to the virtualization-layer interface 308 rather than to the actual hardware interface 306. The virtualization layer 304 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 304 ensures that each of the VMs currently executing within the virtual environment receive a fair allocation of underlying hardware devices and that all VMs receive sufficient devices to progress in execution. The virtualization-layer interface 308 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 304 includes a virtual-machine-monitor module 318 that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization-layer interface 308, the accesses result in execution of virtualization-layer code to simulate or emulate the privileged devices. The virtualization layer additionally includes a kernel module 320 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 304 essentially schedules execution of VMs much like an operating system schedules execution of application programs, so that the VMs each execute within a complete and fully functional virtual hardware layer.

FIG. 3B shows a second type of virtualization. In FIG. 3B, the server computer 340 includes the same hardware layer 342 and operating system layer 344 as the hardware layer 202 and the operating system layer 204 shown in FIG. 2. Several application programs 346 and 348 are shown miming in the execution environment provided by the operating system 344. In addition, a virtualization layer 350 is also provided, in computer 340, but, unlike the virtualization layer 304 discussed with reference to FIG. 3A, virtualization layer 350 is layered above the operating system 344, referred to as the "host OS," and uses the operating system interface to access operating-system-provided functionality as well as the hardware. The virtualization layer 350 comprises primarily a VMM and a hardware-like interface 352, similar to hardware-like interface 308 in FIG. 3A. The virtualization-layer/hardware-layer interface 352, equivalent to interface 216 in FIG. 2, provides an execution environment for a number of VMs 356-358, each including one or more application programs or other higher-level computational entities packaged together with a guest operating system.

In FIGS. 3A-3B, the layers are somewhat simplified for clarity of illustration. For example, portions of the virtualization layer 350 may reside within the host-operating-system kernel, such as a specialized driver incorporated into the host operating system to facilitate hardware access by the virtualization layer.

Figure 4:
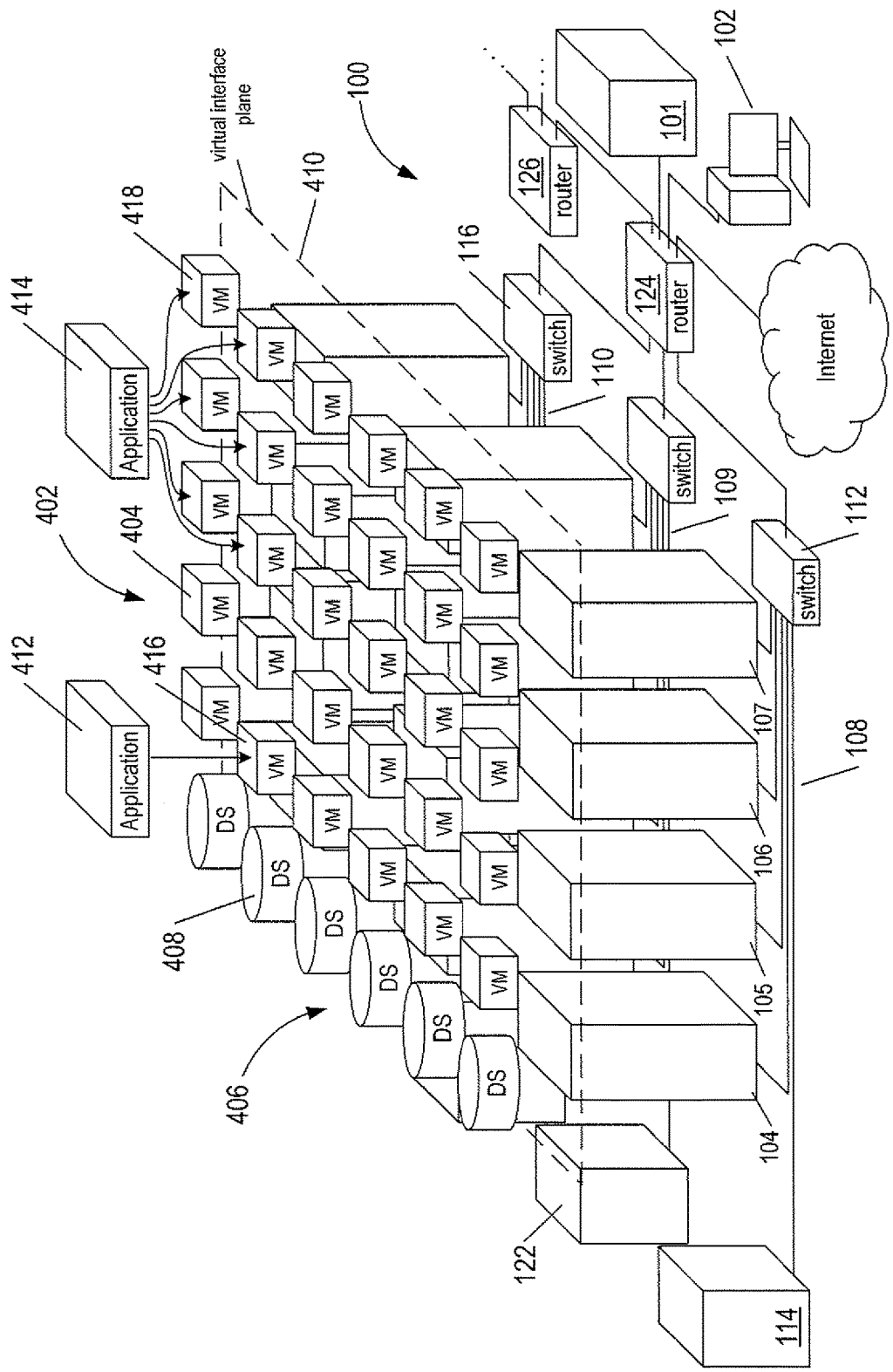
FIG. 4 shows an example set of virtual machines and datastores above a virtual interface plane in a cloud-computing facility.

FIG. 4 shows an example set of VMs 402, such as VM 404, and a set of datastores ("DS") 406, such as DS 408, above a virtual interface plane 410. The virtual interface plane 410 represents a separation between a physical resource level that comprises the server computers and mass-data storage arrays and a virtual resource level that comprises the VMs and DSs. The set of VMs 402 may be partitioned to run on different server computers, and the set of DSs 406 may be partitioned on different mass-storage arrays. Because the VMs are not bound physical devices, the VMs may be moved to different server computers in an attempt to maximize efficient use of the cloud-computing infrastructure 100 resources. For example, each of the server computers 104-107 may initially run three VMs. However, because the VMs have different workloads and storage requirements, the VMs may be moved to other server computers with available data storage and computational resources. Certain VMs may also be grouped into resource pools. For example, suppose a host is used to run five VMs and a first department of an organization uses three of the VMs and a second department of the same organization uses two of the VMs. Because the second department needs larger amounts of CPU and memory, a systems administrator may create one resource pool that comprises the three VMs used by the first department and a second resource pool that comprises the two VMs used by the second department. The second resource pool may be allocated more CPU and memory to meet the larger demands. FIG. 4 shows two application programs 412 and 414. Application program 412 runs on a single VM 416. On the other hand, application program 414 is a distributed application that runs on six VMs, such as VM 418. The application programs 412 and 414 may be owned by a data center customer who would like Methods described determine a capacity-forecast model based on historical relationship between an application program business metrics and capacity metric data of data center resources. FIGS. 5-10 illustrate determination of a capacity-forecast model based on selected sets of historical capacity metric data and business metric data. The following methods of determining a suitable capacity-forecast model described below may be applied to any pair of capacity and business metric data sets. Examples of capacity metrics include, but are not limited to, CPU (%) usage, CPU (Ghz) usage, memory usage, I/O, used datastore, disk usage, net demand (%), used disk space, and total memory. Examples of business metrics for a data center customers application program include, but are not limited to, average application response time, user count, count of concurrent users, object count, earned money per day, month, or year, and passed/failed transactions.

Methods described below may be used to create different capacity-forecast models for any pair of business and capacity metric data sets. Methods also include determine whether or not the business and capacity metric data are correlated.

Figure 5A:
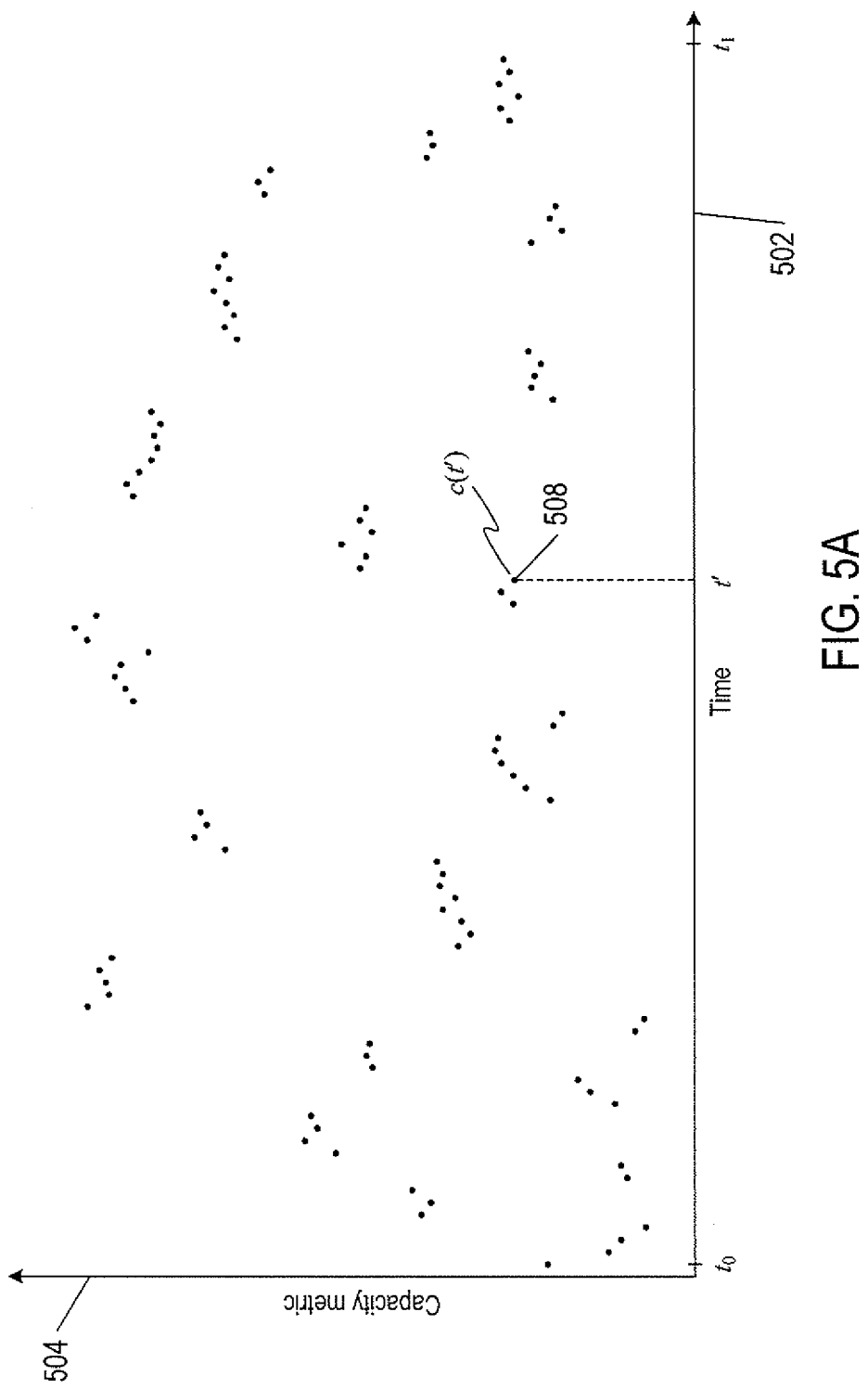
FIGS. 5A-5B shows plots of historical capacity and business metric data collected over the same time period.
Figure 5B:
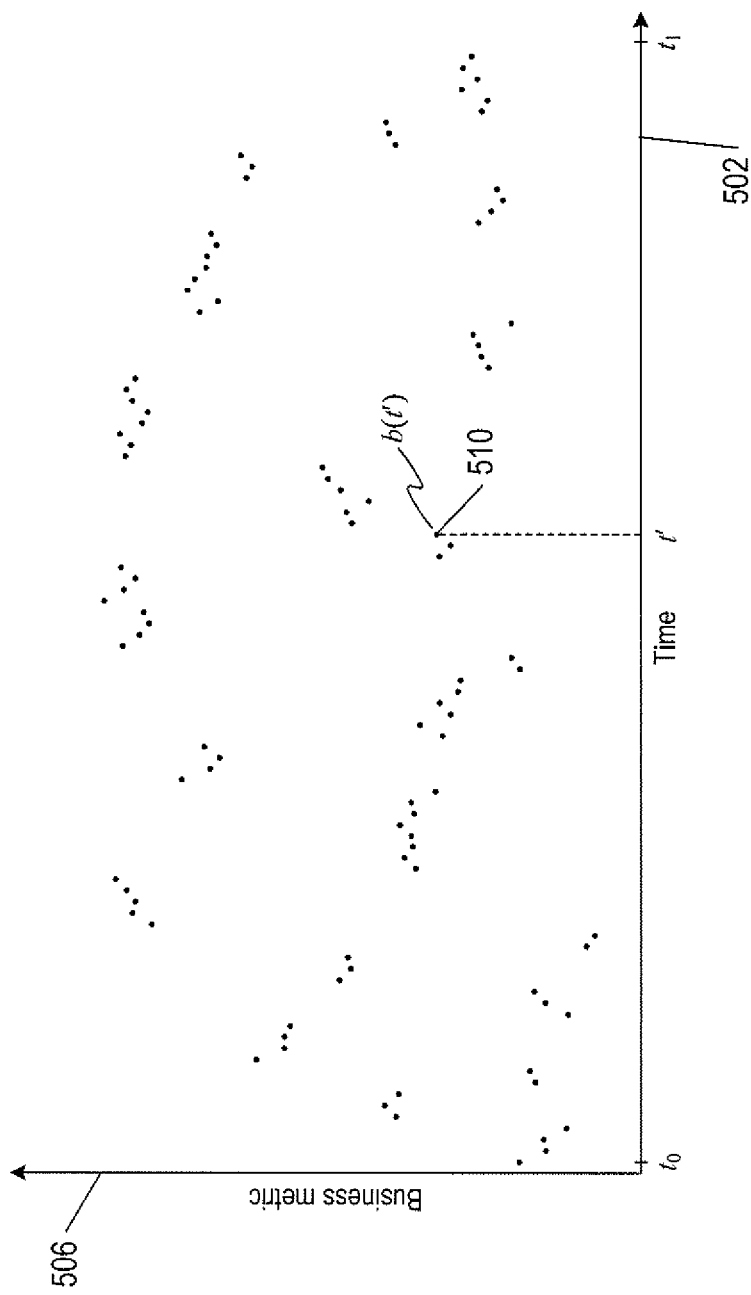

FIGS. 5A-5B shows plots of historical capacity metrics and business metrics collected over the same time period. In FIGS. 5A-5B, horizontal axis 502 represents time. In FIG. 5A, vertical axis 504 represents a range of values of the capacity metric. In FIG. 5B, vertical axis 506 represents a range of values of the business metric. Times $t_0$ and $t_1$ located long the time axis 502 in FIGS. 5A and 5B represent end points of a time period $[t_0, t_1]$ in which capacity and business metrics are collected. Dots in FIG. 5A represent values of the capacity metric recorded at time stamps in the time period $[t_0, t_1]$. The set of capacity metric values in the time period $[t_0, t_1]$ is represented by $$\{c(t): t_0 \leq t \leq t_1\} \quad (1)$$

where c(t) is a capacity metric value at time stamp t. Dots in FIG. 5B represent values of the business metric recorded at the same time stamps in the time period $[t_0, t_1]$. The set of business metric values in the time period $[t_0, t_1]$ is represented by $$\{b(t): t_0 \leq t \leq t_1\} \quad (2)$$

where b(t) is a business metric value at time stamp t. Dot 508 in FIG. 5A represents a capacity metric value c(t') recorded at time stamp t', and dot 510 in FIG. 5B represents a business metric value b(e) recorded at the same time stamp t'. The capacity metric c(t) may be response time of a data center customer's application program to request from users and the business metric b(t) may be the number of application program users. In other words, capacity metric value c(t') 508 may represent a response time of the data center customer's application program when the number of application program users is at a level represented by business metric value b(t') 510.

The capacity metric data is partitioned into subsets of capacity metric data. Quantiles denoted by $q_k$, where subscript k=1, K, are used to partition a set of historical capacity metric data into K+1 subsets of capacity metric data, the subsets having approximately equal numbers of historical capacity metric data if for the sequence of quantiles $q_1, \ldots, q_K$, $q_{k+1} - q_k = $ constant for $k=1, \ldots, K$.

Figure 6:
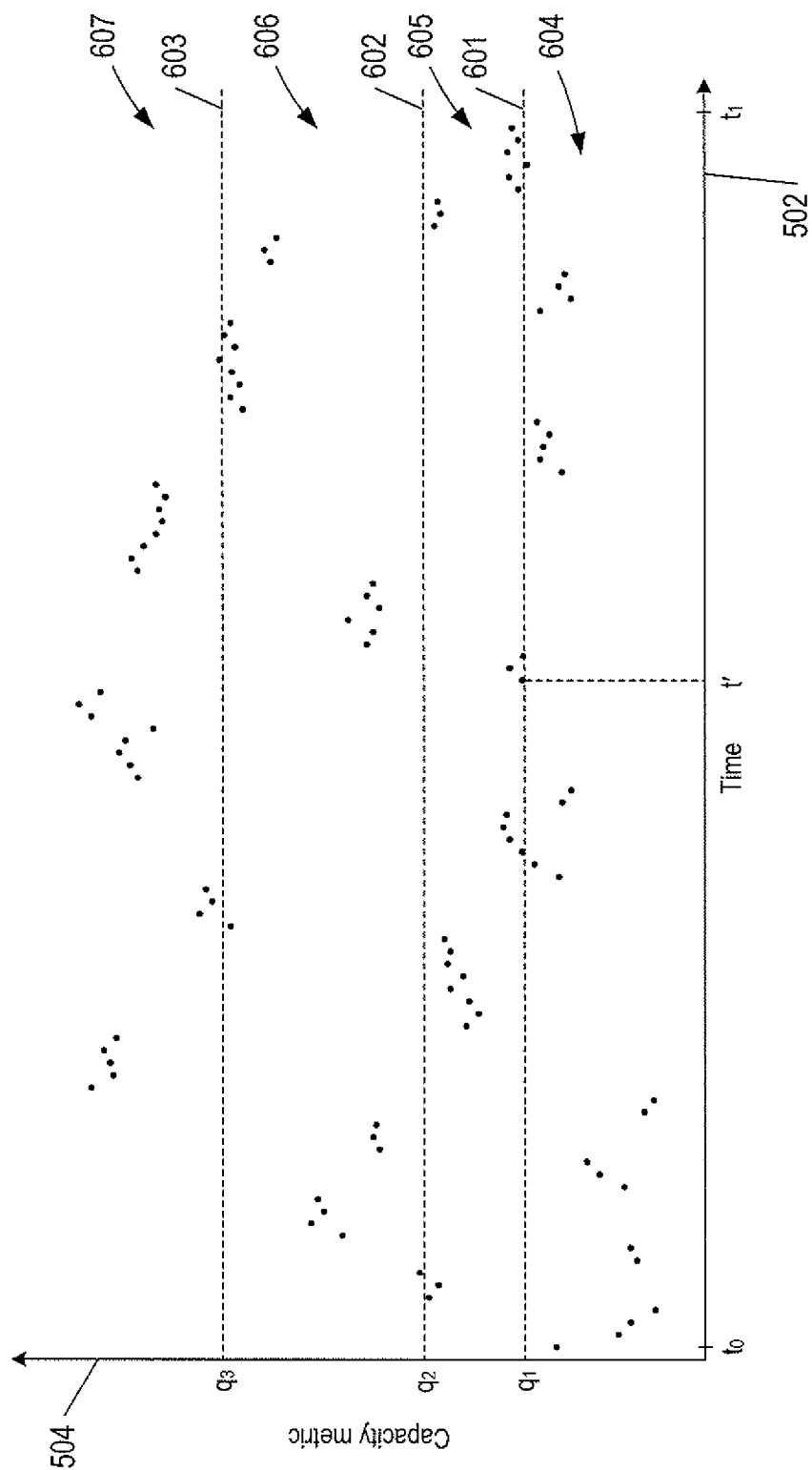
FIG. 6 shows a plot of the capacity metric data shown in FIG. 5A partitioned into four subsets.

FIG. 6 shows a plot of the capacity metric data shown in FIG. 5A partitioned into four subsets of capacity metric data. Dashed lines 601-603 represent quartiles denoted by $q_1$, $q_2$, and $q_3$ that separate the capacity metric data into four subsets 604-607 of capacity metric data. In the example of FIG. 6, there are a total of 100 capacity metric values. The three quartiles 601-603 partition the 100 capacity metric values into the four subsets 604-607 such that each subset contains 25 capacity metric values:

$$Q_1 = \{c(t): c(t) < q_1\} \quad (3a)$$

$$Q_2 = \{c(t): q_1 \leq c(t) < q_2\} \quad (3b)$$

$$Q_3 = \{c(t): q_2 \leq c(t) < q_3\} \quad (3c)$$

$$Q_4 = \{c(t): q_3 \leq c(t)\} \quad (3d)$$

Burst spikes in the capacity metric data are determined by incrementally sliding a time window of duration, T, along the axis 502. In each time window, a percentage p of capacity metric values that are greater than a fixed quantile q. A time window is identified as having a burst spike of capacity metric data if the percentage p satisfies the condition for the fixed quantile q:

$$p \geq Th_p \quad (4)$$

where $Th_p$ is a percentage threshold.

Figure 7A:
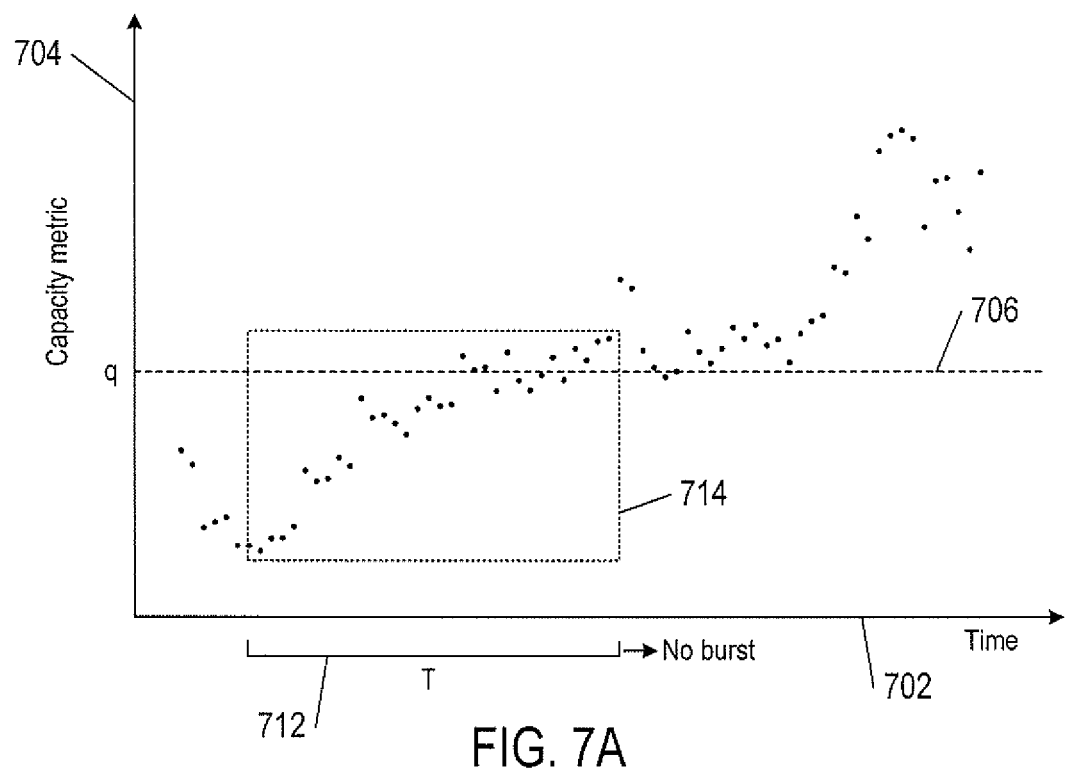
FIGS. 7A-7C show identifying a time window with a burst spike of capacity metric data.
Figure 7B:
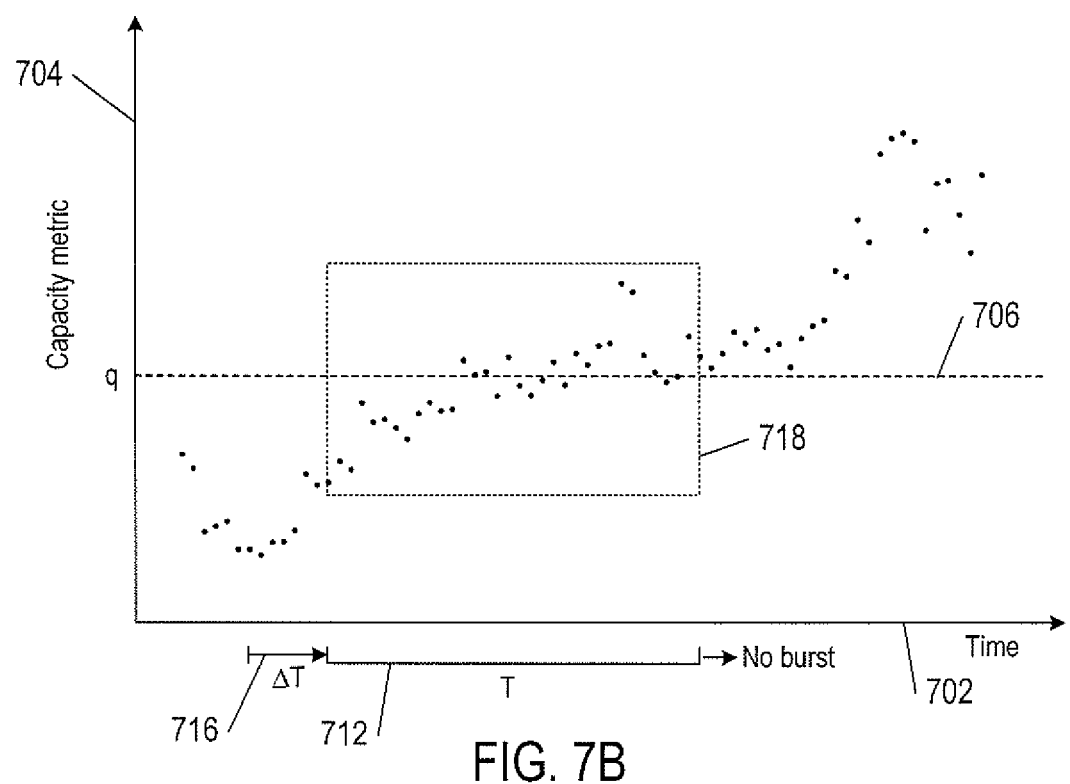
Figure 7C:
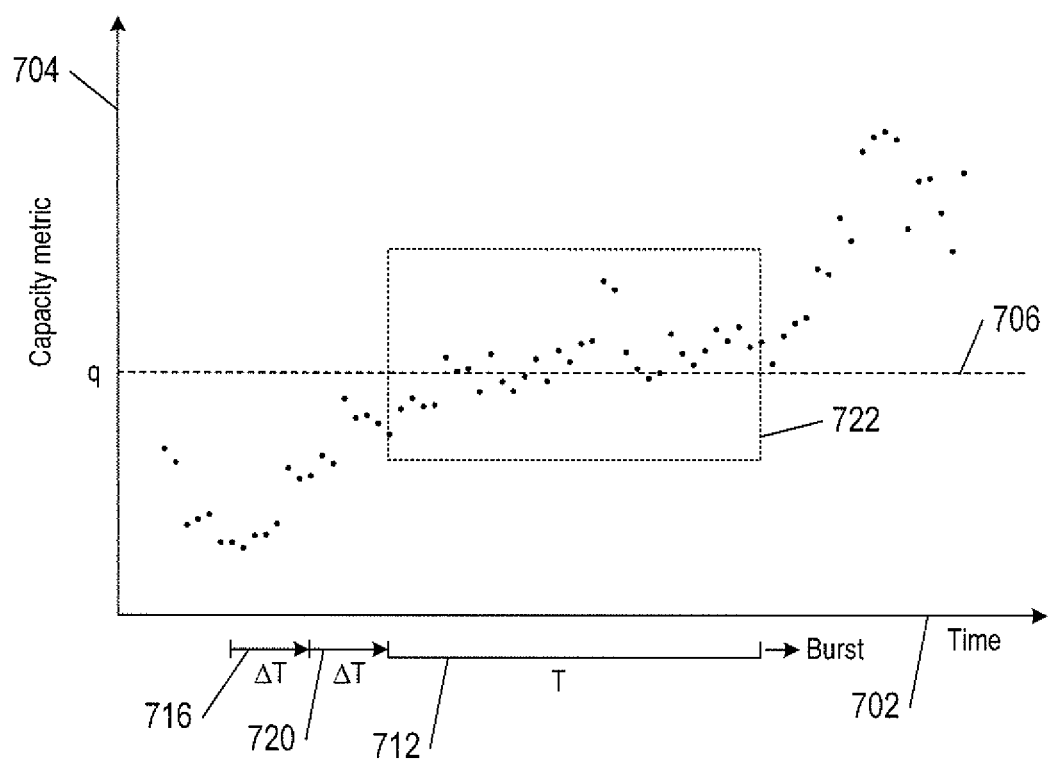

FIGS. 7A-7C show identifying a time window with a burst spike of capacity metric data. In FIGS. 7A-7C, horizontal axis 702 represents time, vertical axis 704 represents a range of capacity metric values. Dashed line 706 represent a fixed quantile q. A bracket 712 is used to represents a time window of duration T that is incrementally moved along the time axis 702 by the time increment $\Delta t$. In FIG. 7A, a box 714 encloses a subset of capacity metric values with time stamps in the time window 712. Nine of the 33 capacity metric values in the box 714 have capacity metric values greater than the quantile q (i.e., p=9/33≈27%). In FIG. 7B, the time window 712 has been moved by the time increment 716. A box 718 encloses a subset of capacity metric values with time stamps in the time window 712. Of the 33 capacity metric values in the box 718, 14 have capacity metric values that are greater than the quantile q (i.e., p=14/33≈42%). In FIG. 7C, the time window 712 has been moved again by the time increment 720. A box 722 encloses a subset of capacity metric values with time stamps in the time window 712. Of the 33 capacity metric values in a box 722, 20 have capacity metric values that are greater than the quantile q (i.e., p=20/33≈61%). If the percentage threshold is $Th_p=50\%$, the time windows in FIGS. 7A and 7B are not considered as having burst spikes of capacity metric data. On the other hand, the time window in FIG. 7C is identified as containing a burst spike of capacity metric data.

The quantile "q" may be determined in a number of ways. The capacity data may be partitioned into K subsets by quantiles $q_k$, where k=1, . . . , K. For example, the quantiles $q_1=0.1$, $q_2=0.11$, $q_3=0.13$, . . . , $q_K=0.99$. In one implementation, for each quantile, the windows with burst spikes and corresponding correlation coefficient of capacity and business metric are determined. The quantile with a maximum correlation coefficient is selected. In another implementation, the correlation coefficient where the burst spikes are determined for the $q_1$ quantile for the capacity metric and $q_j$ quantile for the business metric. This process is repeated for i,j=1, . . . , K until a pair of quantiles with a maximum correlation coefficient between the capacity and metric data is determined.

An average capacity metric value is calculated from the capacity metric data with time stamps in each of the M time windows identified as having burst spikes of capacity metric data:

$$\bar{c}_m = \frac{1}{L} \sum_{l=1}^{L} c(t_l) \quad (5)$$

where $\bar{c}_m$ is the average metric data value of the capacity metric data in the mth time window;

L is the number of capacity metric values in the mth time window; and $t_l$ is a time stamp in the time window.

Figure 8A:
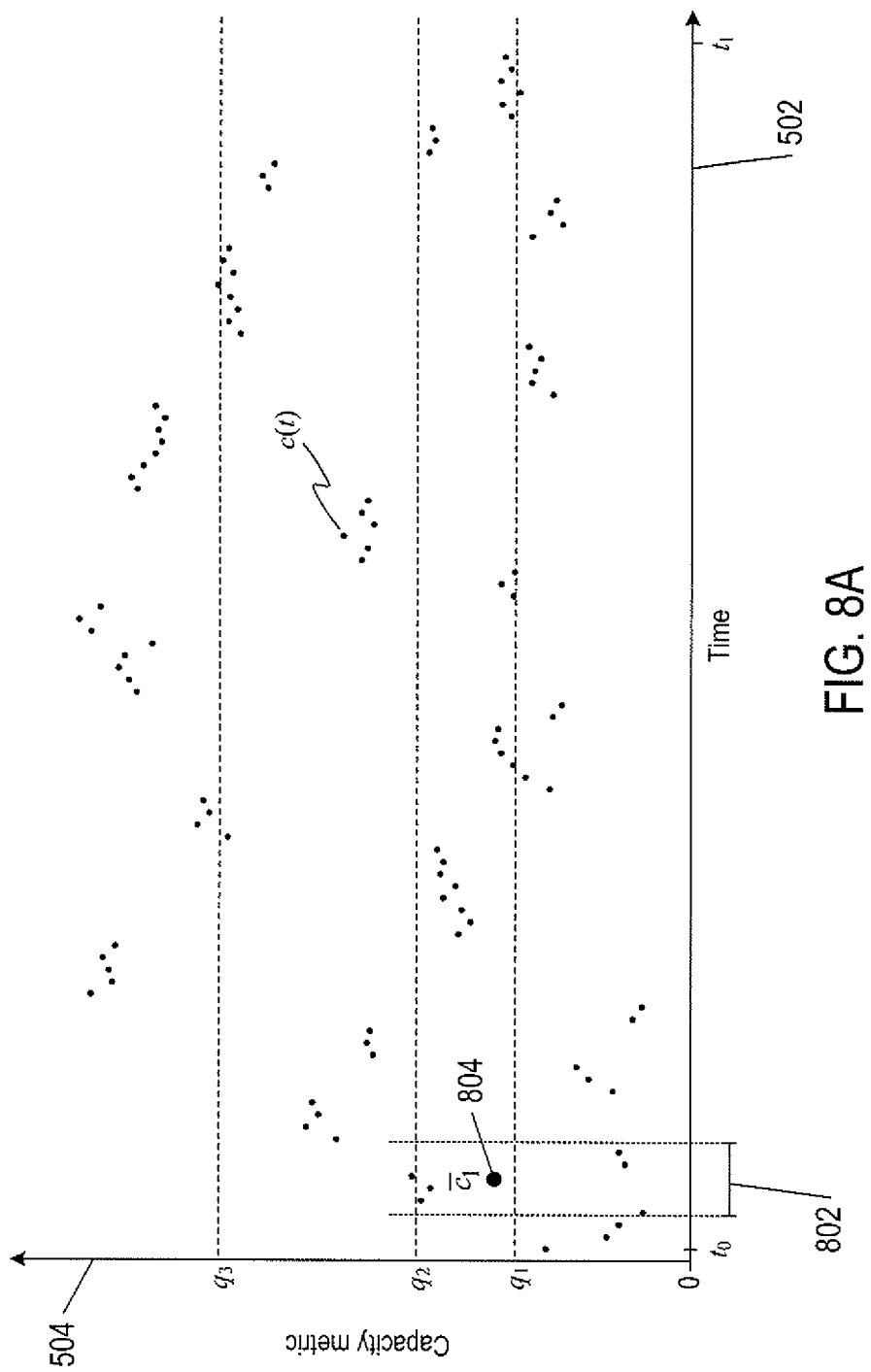
FIGS. 8A-8B show average capacity metric values calculated from capacity metric data shown in FIG. 5A.
Figure 8B:
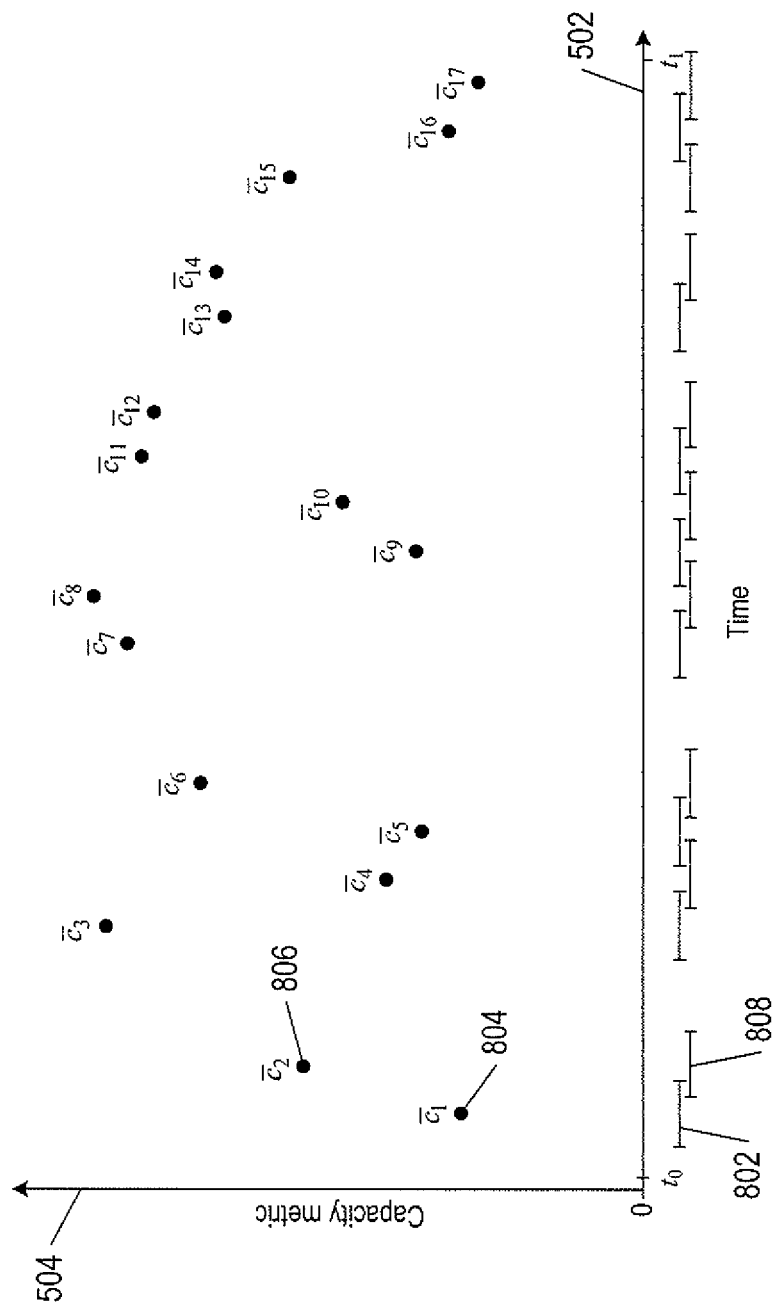

FIG. 8A shows an average capacity metric value calculated from capacity metric data shown in FIG. 5A. A segments 802 located along the time axis 502 represent a time window in which the capacity metric values with time stamps in the time window 802 have been identified as a burst spike. Dot 804 represents an average capacity metric value denoted by $\bar{c}_1$ of the capacity metric data with time stamps in the time window 802. FIG. 8B shows average capacity metric values calculate from capacity metric data in a number of time windows located along the time axis 502. For example, dot 806 represents an average capacity metric value denoted by $\bar{c}_2$ of the capacity metric data with time stamps in a time window 808. Note that a number of the time windows overlap, such as time windows 802 and 808.

An average business metric value is calculated from the business metric data with time stamps in each of the M time windows identified as having burst spikes of capacity metric data:

$$\bar{b}_m = \frac{1}{L}\sum_{l=1}^{L} b(t_l) \qquad (6)$$

where $\bar{b}_m$ is the average business metric value of the business metric data in the mth time window.

In other words, for each average capacity metric value calculated from capacity metric data in a time window identified as having burst spike, a corresponding average business metric value is calculated from business metric data that lies in the same time window.

Figure 9A:
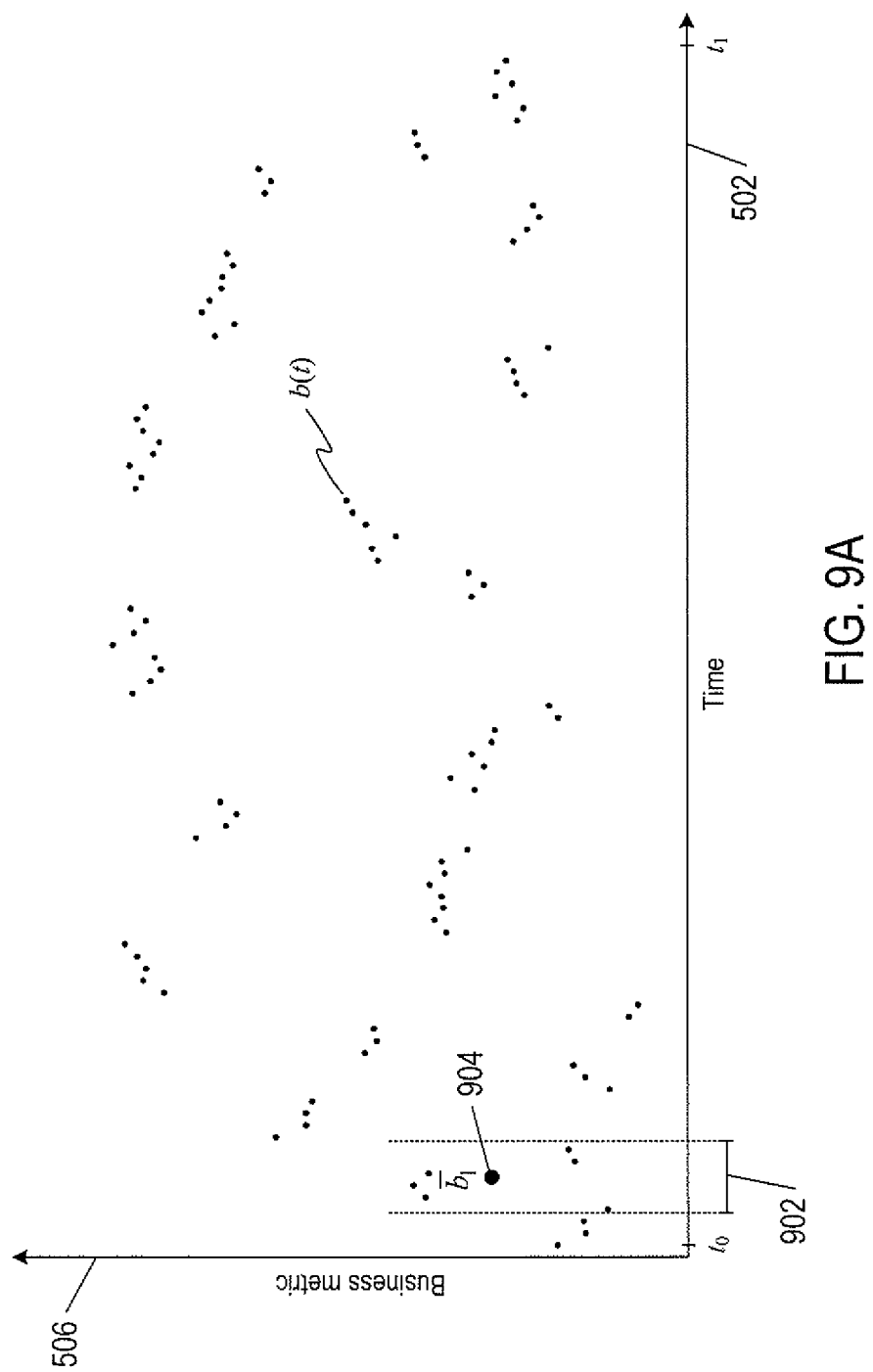
FIGS. 9A-9B show average business metric values calculated from business metric data shown in FIG. 5B.
Figure 9B:
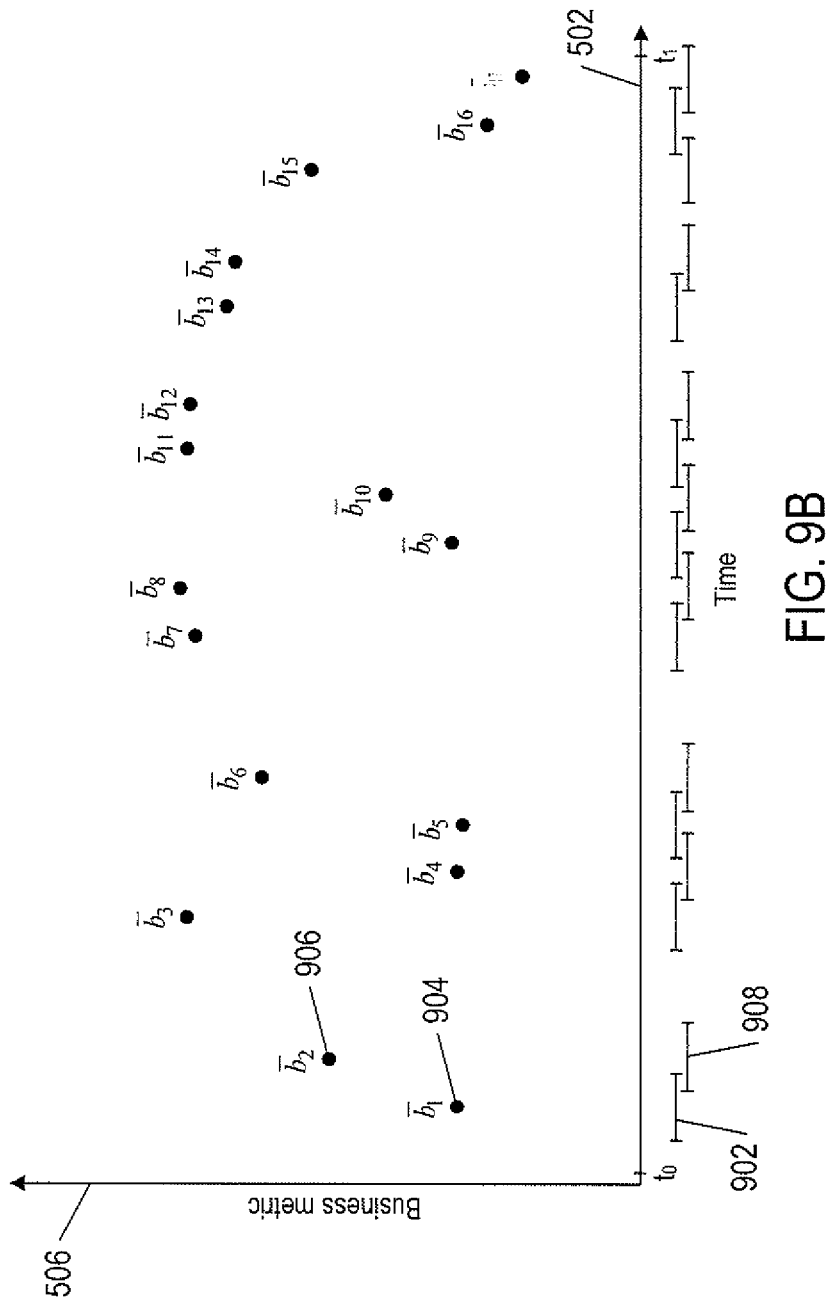

FIG. 9A shows an average business metric value calculated from business metric data shown in Figure 5B. Segment 902 located along the time axis 502 corresponds to the time window 802 in FIG. 8A in which the capacity metric values with time stamps in the time window 802 have been identified as a burst spike. Dot 904 represents an average business metric value denoted by $\bar{b}_1$ of the business metric data with time stamps in the time window 902. FIG. 9B shows average business metric values calculated from business metric data in the same time windows located along the time axis 502 as shown in FIG. 8B. For example, dot 906 represents an average business metric value denoted by $\bar{b}_2$ of the business metric data with time stamps in a time window 908.

Each of the average capacity metric values is normalized as follows:

$$\bar{c}_{0m} = \frac{\bar{c}_m - \mu_c}{\sigma_c} \qquad (7)$$

where $$\mu_c = \frac{1}{M}\sum_{m=1}^{M} \bar{c}_m$$

is the mean value of the average capacity metric values; and $\sigma_c = \sqrt{1/M(\bar{c}_m-\mu_c)^2}$ is the standard deviation of the average capacity metric values.

A set of normalized capacity metric values is given by $\{\bar{c}_{0m}\}_{m=1}^{M}$. Each of the average business metric values is also normalized as follows:

$$\bar{b}_{0m} = \frac{\bar{b}_m - \mu_b}{\sigma_b} \qquad (8)$$

where $\mu_b = \frac{1}{M}\sum_{m=1}^{M} \bar{b}_m$ is the mean value of the average business metric values; and $$\sigma_b = \sqrt{\frac{1}{M}(\bar{b}_m - \mu_c)^2}$$

is the standard deviation of the average business metric values.

A set of normalized business metric values is given by $\{\bar{b}_{0m}\}_{m=1}^{M}$.

A correlation coefficient is calculated for the sets of normalized capacity and business metric values $\{\bar{c}_{0m}\}_{m=1}^{M}$ and $\{\bar{b}_{0m}\}_{m=1}^{M}$ and used to determine whether or not a suitable capacity-forecast model can be determined. The correlation coefficient may be calculated as follows:

$$\rho = \frac{1}{M}\sum_{m=1}^{M} \left(\frac{\bar{c}_{0m} - \mu_{0c}}{\sigma_{0c}}\right)\left(\frac{\bar{b}_{0m} - \mu_{0b}}{\sigma_{0b}}\right) \qquad (9)$$

where average normalized capacity and business metric values are calculated as follow:

$$\mu_{0c} = \frac{1}{M}\sum_{m=1}^{M} \bar{c}_{0m} \qquad (10a)$$

$$\mu_{0b} = \frac{1}{M}\sum_{m=1}^{M} \bar{b}_{0m} \qquad (10b)$$

and standard deviations of the normalized capacity and business metric values are calculated as follows:

$$\sigma_{0c} = \sqrt{\frac{1}{M}\sum_{m=1}^{M}(\bar{c}_{0m} - \mu_{0c})^2} \qquad (11a)$$

$$\sigma_{0b} = \sqrt{\frac{1}{M}\sum_{m=1}^{M}(\bar{b}_{0m} - \mu_{0b})^2} \qquad (11b)$$

When the correlation coefficient calculated according to Equation (9) satisfies a condition given by:

$$\rho \geq Th_{cor} \qquad (12)$$

where $Th_{cor}$ is correlation threshold, the normalized capacity and business metric data are sufficiently correlated to calculate a capacity-forecast model. A linear capacity-forecast model may be calculated according to:

$$\bar{c}_0(t) = m_s \bar{b}_0(t) + w \qquad (13)$$

where the slope in Equation (14) is given by $$m_s = \frac{\sum_{m=1}^{M} \bar{c}_{0m}\bar{b}_{0m} - \frac{1}{M}\sum_{m=1}^{M}\bar{c}_{0m}\sum_{m=1}^{M}\bar{b}_{0m}}{\sum_{m=1}^{M}(\bar{b}_{0m})^2 - \frac{1}{M}\left(\sum_{m=1}^{M}\bar{b}_{0m}\right)^2}$$

and the capacity metric axis intercept in Equation (13) is given by $$w = \mu_{0c} - m_s \mu_{0b}$$

The slope $m_s$ and capacity metric axis intercept $w$ are calculated using linear least squares, which assumes a linear relationship between the normalized capacity and business metric data. The capacity-forecast model of Equation (13) may be used as the capacity-forecast model to calculate an estimated normalized capacity from a normalized business metric. In other words, the behavior of the normalized capacity metric data may be predicted from the normalized business metric data using the capacity-forecast model of Equation (13).

The capacity-forecast model error term in Equation (13) may be calculated as follows:

$$E_{cap} = \frac{\sum_{m=1}^{M}(\bar{c}_{0m} - \mu_{0c})(\bar{b}_{0m} - \mu_{0b})}{\sum_{m=1}^{M}(\bar{c}_{0m} - \mu_{0c})^2 \sum_{m=1}^{M}(\bar{b}_{0m} - \mu_{0b})^2} \quad (14)$$

The capacity-forecast model error term $E_{cap}$ gives a values for the overall quality of the capacity-forecast model fit to the sets of normalized capacity and business metric values $\{\bar{c}_{0m}\}_{m=1}^{M}$ and $\{\bar{b}_{0m}\}_{m=1}^{M}$. The capacity-forecast model is acceptable for calculating estimated normalized capacity metric values when the capacity-forecast model error term calculated according to Equation (14) satisfies the condition:

$$E_{cap} \leq Th_{error} \quad (15)$$

where $Th_{error}$ is a capacity-forecast model threshold.
As long as the capacity-forecast model error is less than the threshold $Th_{error}$, the linear capacity-forecast model may be used to calculate estimated capacity metric values.

Figure 10:
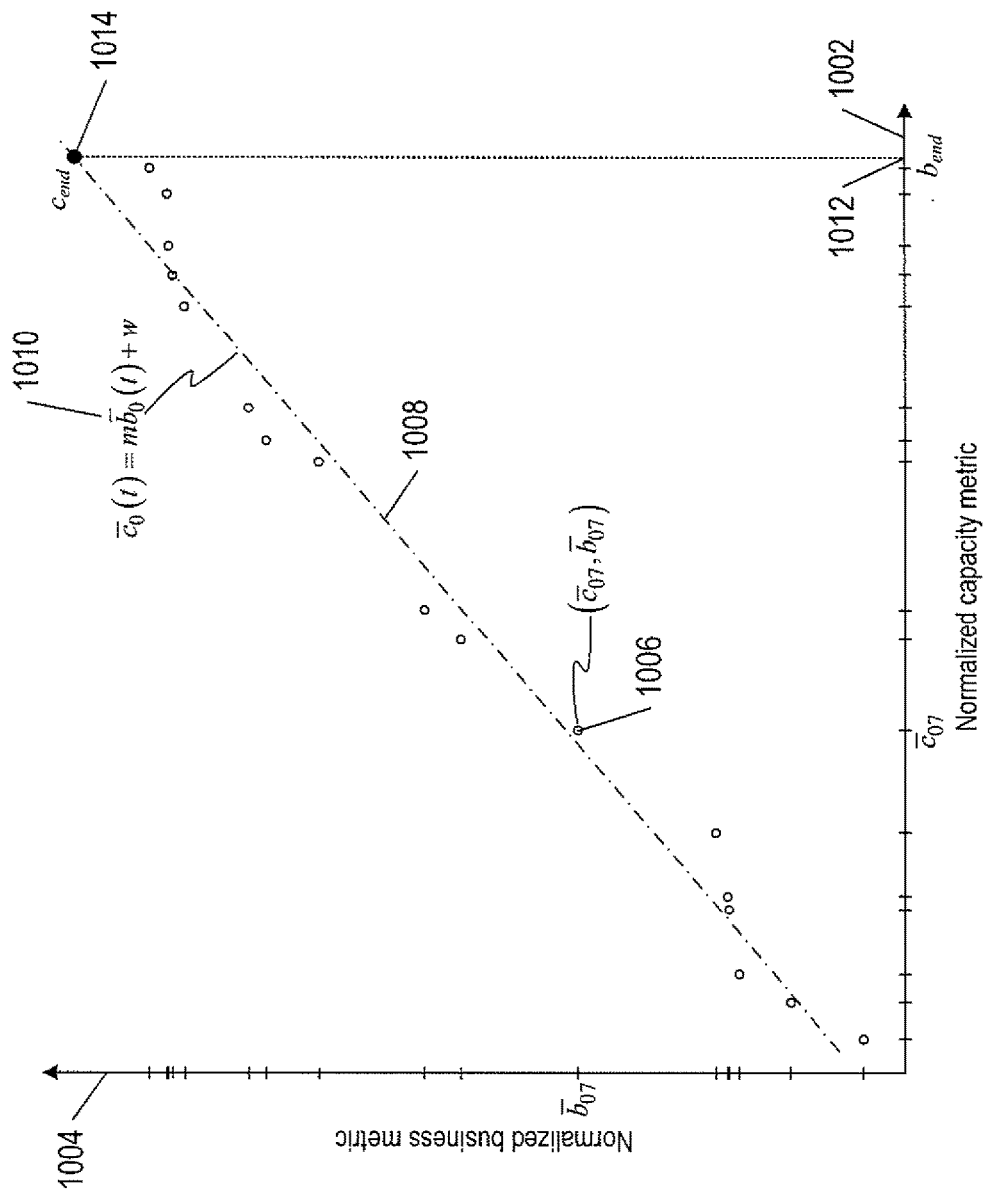
FIG. 10 shows a plot of a set of normalized capacity metric data and a set of normalized business metric data.

FIG. 10 shows a plot of a set of normalized capacity metric data and a set of normalized business metric data. Horizontal axis 1002 represents a range of normalized capacity metric data. Vertical axis 1004 represents a range of normalized business metric data. Marks along the normalized capacity metric data axis 1002 represent the set of normalized capacity metric data $\{\bar{c}_{0m}\}_{m=1}^{17}$, and marks along the normalized business metric data axis 1004 represent the set of normalized metric data $\{\bar{c}_{0m}\}_{m=1}^{17}$. Open circles represents points with coordinates defined by normalized capacity and business metric data. For example, open circle 1006 represents a point with normalized capacity and business metric value coordinates $(\bar{c}_{07}, \bar{b}_{07})$. Dot-dashed line 1008 represents a linear capacity-forecast model 1010 fit the normalized capacity and business metric data coordinates. In this example, the linear capacity-forecast model 1010 satisfies the conditions given by Equations (12) and (15) and may be used to calculate an estimated capacity of data center resource based on a business projection represented by a business metric. For example, suppose $b_{end}$ 1012 represents a projected number of possible users of an application program running in a data center. Substituting $b_{end}$ 1012 into the linear capacity-forecast model 1010 gives an estimated capacity metric data value $c_{end}$ 1014 of the capacity that may be need to meet the demand created by $b_{end}$ number of users. After estimating a future value for the capacity metric, a future budget may be planned if additional capacities are required or optimize resource consumption in case of overprovisioning, which increases efficiency of resource allocations.

The linear capacity-forecast model 1010 may be used in a number of different business scenarios. Let b(t) be an application metric (e.g., total count of users per day) and let c(t) be a capacity metric (e.g., used disk space per day). Assume that the last year average for b(t) was 100 users per day. The linear-forecast model may be used to determine that 1 user was consuming 1 MB disk space. As a result, the maximum for the capacity metric c(t) is 100 MB per day. The linear capacity-forecast model 1010 may be used in a number of other business scenarios:

Scenario 1.
Suppose the data center customer responsible for a web application purchased a disk with 1000 MB of storage capacity. How much improvement in business can be achieved without additional investments? The linear capacity-forecast model 1010 estimates that up to 1000 users can use the web application.

Scenario 2.
Suppose the data center customer currently has only 100 MB of available disk space which was enough for last year. According to future business projections, 100 additional users are expected to use the web application. How much investment is needed in capacity? The linear capacity-forecast model 1010 estimates that at least 100 MB should be purchased.

Scenario 3.
Suppose the data center customer responsible for the web application purchased a disk with 1000 MB capacity a number of years ago. According to future business projections, 100 additional users are expected to use the web application in the next year. The linear capacity-forecast model 1010 may be used to predict that an estimated 200 MB is enough for the next year. The remaining 800 MB is an example of overprovisioning of data center resources, which can be allocated for other purposes.

1) Embodiments are not limited to linear capacity-forecast models. In certain embodiments, the relationship between the normalized capacity and business metric data sets may be approximate by an exponential capacity-forecast model denoted by $$\bar{c}_0(t) = \alpha \exp(\beta \bar{b}_0(t)) \quad (16)$$

In other embodiments, the relationship between the normalized capacity and business metric data sets may be approximate by a logarithmic capacity-forecast model denoted by $$\bar{c}_0(t) = \log \alpha + \beta \bar{b}_0(t) \quad (17)$$

The parameters $\alpha$ and $\beta$ in Equations (16) and (17) may be determined using a non-linear least squares fit to the nonlinear relationships between the normalized capacity and business metric data sets.

Figure 11:
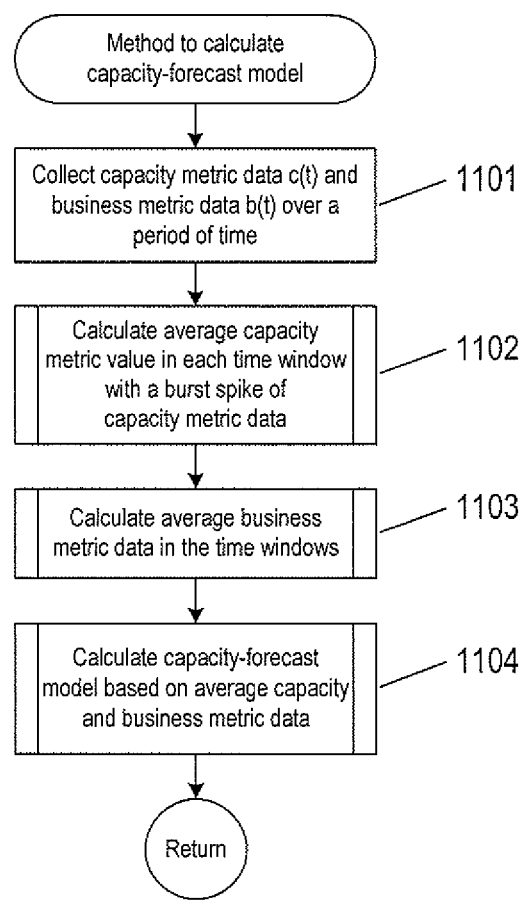
FIG. 11 shows a control flow diagram of a method to determine a capacity-forecast model.

FIG. 11 shows a control flow diagram of a method to determine a capacity-forecast model that may be used to calculate an estimated normalized capacity from a normalized business metric. In block 1101, capacity metric data c(t) and business metric data b(t) are collected over a time period, as described above with reference to FIGS. 5A-5B. In block 1102, a route "calculate average capacity metric value in each time window with a burst spike of capacity metric data" is called. In block 1103, a routine "calculate average business metric data in the time windows" is called. In block 1104, a routine "calculate capacity-forecast model based on average capacity and business metric data" is called.

Figure 12:
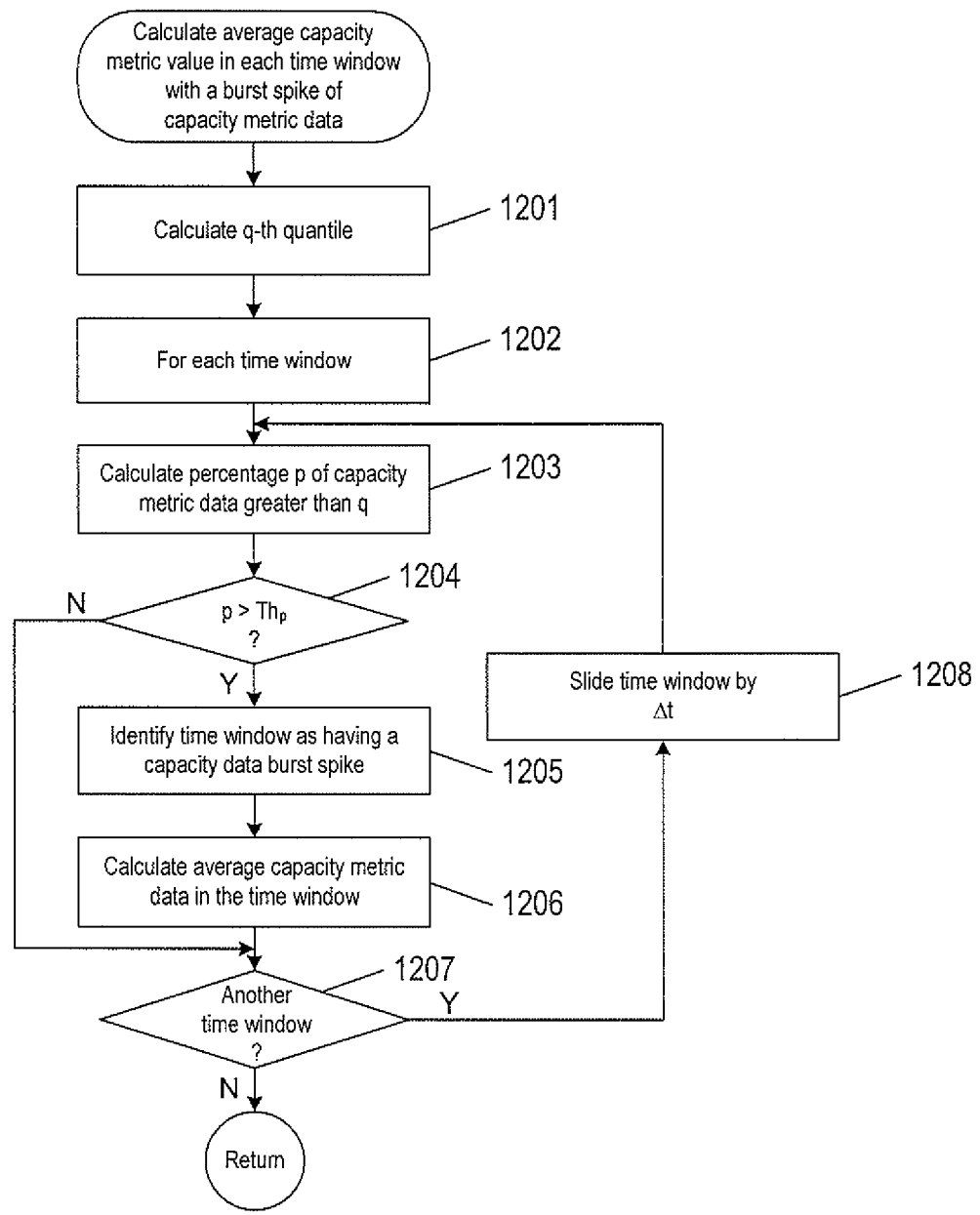
FIG. 12 shows a control-flow diagram of the routine "calculate average capacity metric data in time windows with burst spikes" called in FIG. 11.

FIG. 12 shows a control-flow diagram of the routine "calculate average capacity metric data in time windows with burst spikes" called in block 1102 of FIG. 11. In block 1201, a fixed q-th quantile is determined as described above with reference to FIGS. 7A-7C. A for-loop beginning with block 1202 repeats the operations represented by blocks 1203-1210 for each time window. In block 1203, a percentage p of capacity metric data that is greater that a fixed quantile $q_k$ is calculated as described above with reference to FIGS. 7A-7C. In decision block 1204, when the percentage is greater than a percentage threshold as described above with reference to the condition in Equation (4) and represented by FIG. 7A-7B, control flows to block 1205 in which the time window is identified as having a burst spike of capacity metric data. In block 1206, an average capacity metric value is calculated from the capacity metric data in the time window. In decision block 1207, when another time window is considered, control flows to block 1208 in which the time window is adjusted as described above with reference to FIGS. 7A-7C.

Figure 13:
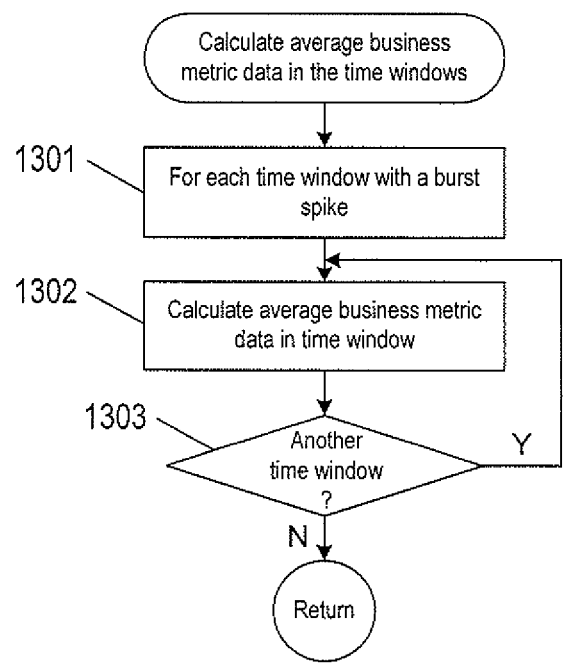
FIG. 13 shows a control-flow diagram of the routine "calculate average business metric data in the time windows" called in FIG. 11.

FIG. 13 shows a control-flow diagram of the routine "calculate average business metric data in the time windows" called in block 1103 of FIG. 11. In block 1301, a for-loop beginning with block 1302 repeats the operations represented by blocks 1302 and 1303 for each time window identified as having a burst spike of capacity metric data. In block 1302, an average business metric value is calculated in the time window identified as having a burst spike of capacity metric data. In decision block 1303, the operation represented by block 1303 is repeated for another time window identified as having a burst spike of capacity metric data.

Figure 14:
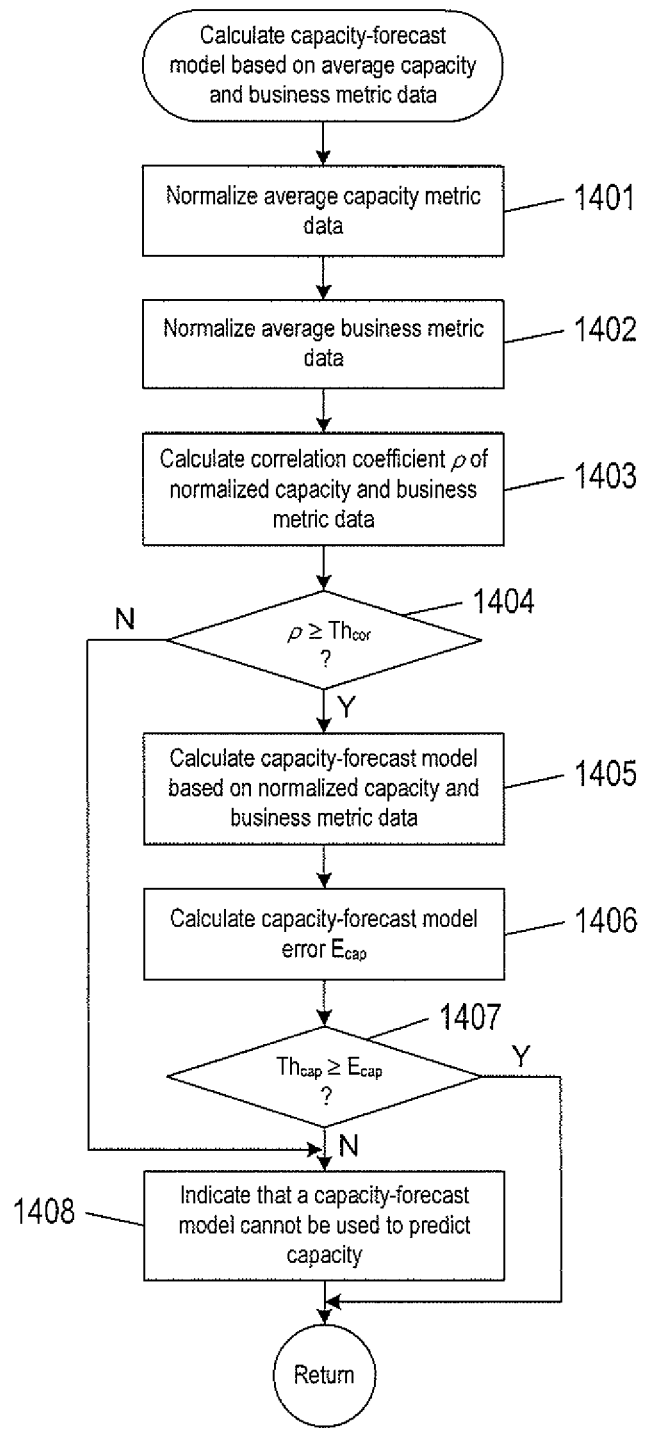
FIG. 14 shows a control-flow diagram of the routine "calculate capacity-forecast model based on average capacity and business metric data" called in FIG. 11.

FIG. 14 shows a control-flow diagram of the routine "calculate capacity-forecast model based on average capacity and business metric data" called in block 1104 of FIG. 11. In block 1401, the average capacity metric data is normalized as described above with reference to Equation (7). In block 1402, the average business metric data is normalized as described above with reference to Equations (8). In block 1404, a correlation coefficient is calculated for normalized capacity and business metric data, as described above with reference to Equation (9)-(11). In decision block 1404, when the correlation coefficient is greater than a correlation threshold, control flows to block 1405, otherwise control flows to block 1408. In block 1405, a capacity-forecast model is calculated based on the normalized capacity and business metric data, as described above with reference to Equation (13). In block 1406, a capacity-forecast model error term is calculated according to Equation (14). In decision block 1407, the capacity-forecast model error term is greater than a capacity-forecast model threshold error, control flow to block 1408, otherwise, the capacity-forecast model may be used to calculate estimated capacities from project business metrics. In block 1408, a response is given indicating that a capacity-forecast model cannot be used of the particular sets of capacity and business metric data.

Figure 15:
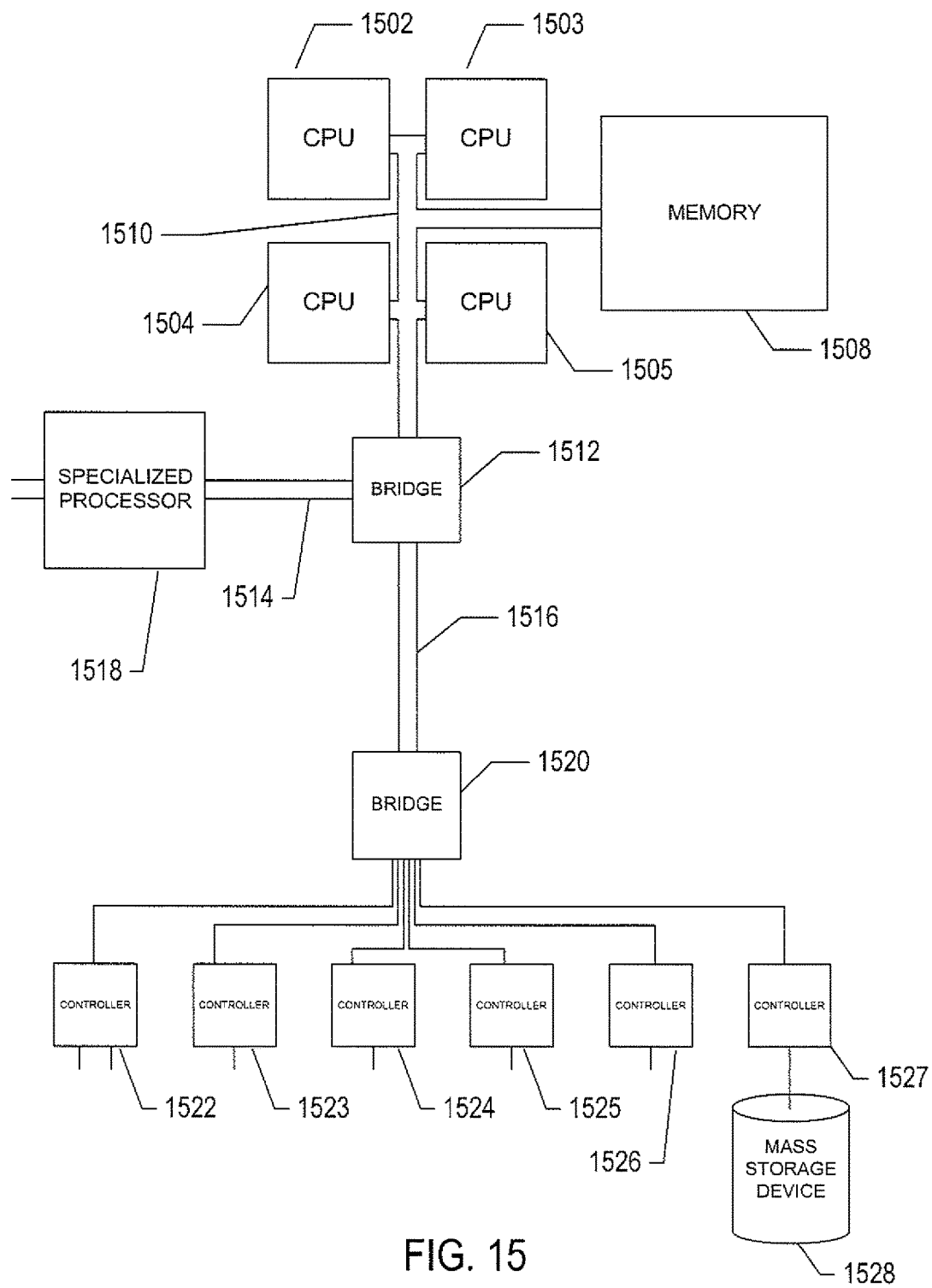
FIG. 15 shows an architectural diagram for various types of computers.

FIG. 15 shows an architectural diagram for various types of computers. Computers that receive, process, and store event messages may be described by the architectural diagram shown in FIG. 15, for example. The computer system contains one or multiple central processing units ("CPUs") 1502-1505, one or more electronic memories 1508 interconnected with the CPUs by a CPU/memory-subsystem bus 1510 or multiple busses, a first bridge 1512 that interconnects the CPU/memory-subsystem bus 1510 with additional busses 1514 and 1516, or other types of high-speed interconnection media, including multiple, high-speed serial interconnects. These busses or serial interconnections, in turn, connect the CPUs and memory with specialized processors, such as a graphics processor 1518, and with one or more additional bridges 1520, which are interconnected with high-speed serial links or with multiple controllers 1522-1527, such as controller 1527, that provide access to various different types of mass-storage devices 1528, electronic displays, input devices, and other such components, sub-components, and computational devices. The methods described above are stored as machine-readable instructions in one or more data-storage devices that when executed cause one or more of the processing units 1502-1505 to carried out the instructions as described above. It should be noted that computer-readable data-storage devices include optical and electromagnetic disks, electronic memories, and other physical data-storage devices.

Experimental Results

Two simulation experiments identified below as Scenario 1 and Scenario 2 were performed using capacity metrics from one side and application metrics as concurrent users or number of monitored objects from the other side.

Scenario 1.

Figure 16:
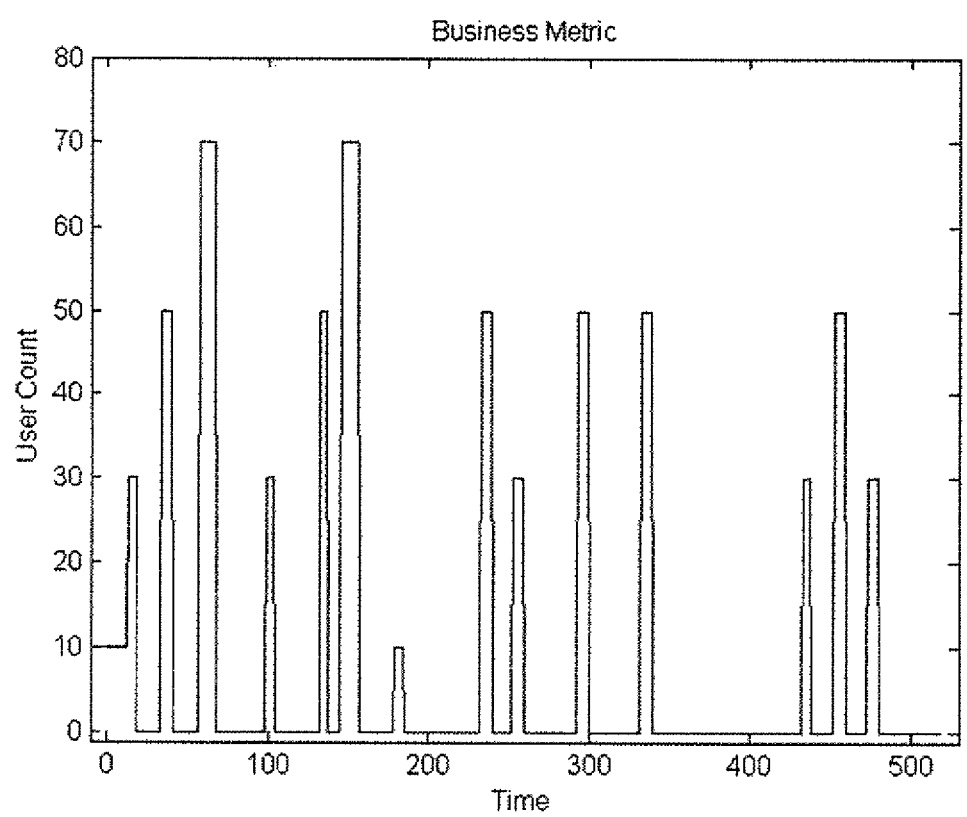
FIGS. 16-25 show experiment results obtained for two different scenarios.
Figure 17:
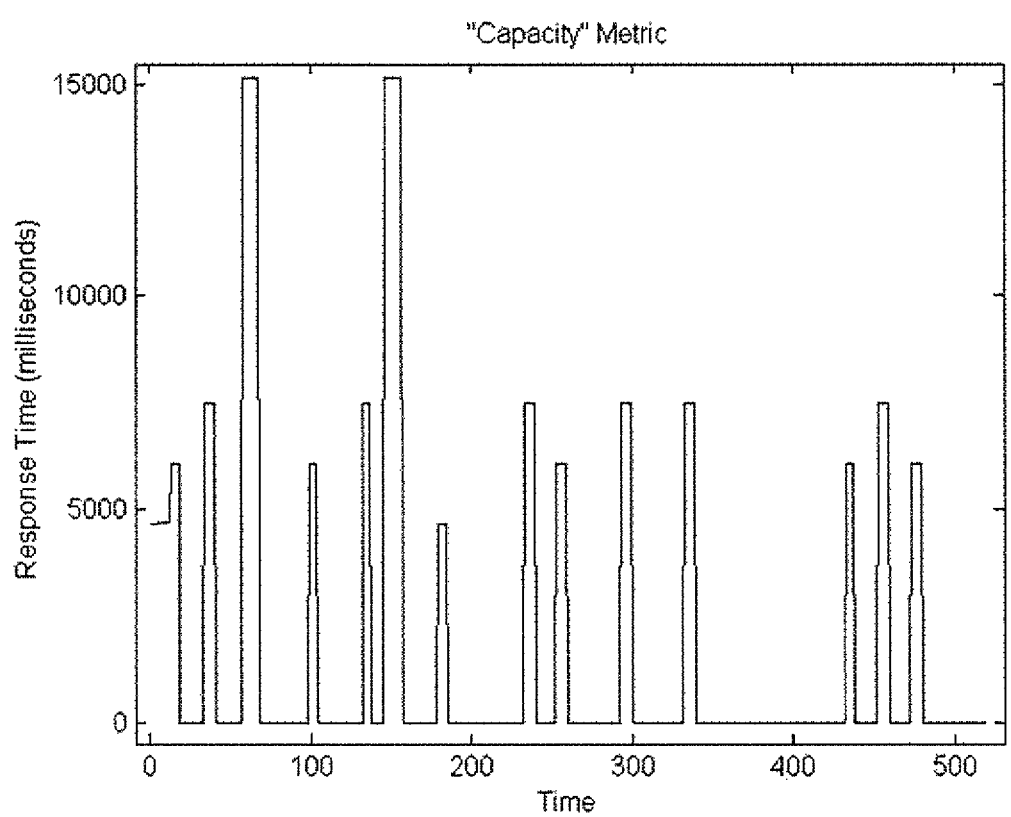
Figure 18:
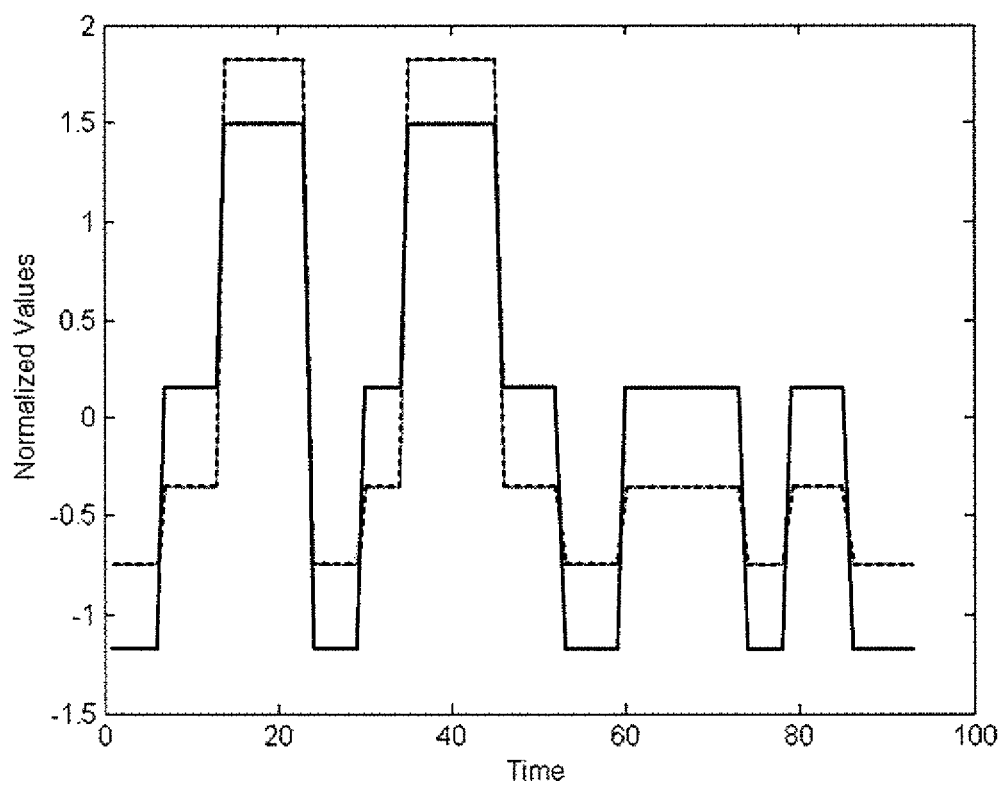
Figure 19:
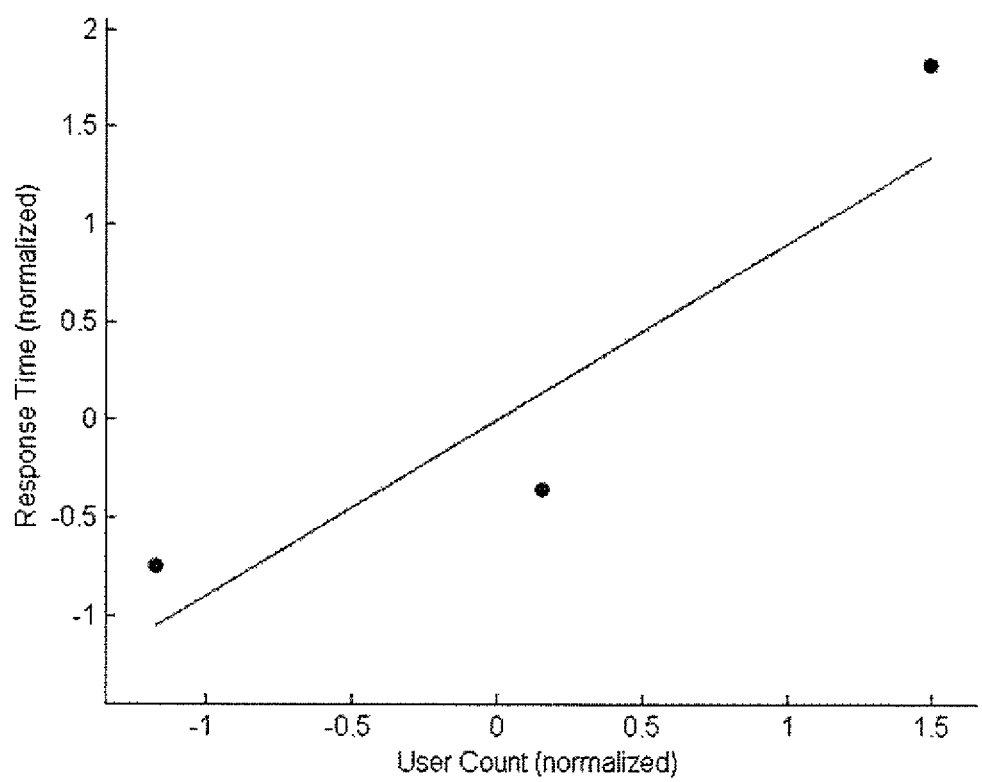

Making a stress on the number of concurrent clients. A single node of VMware vRealize Operations Management tool with small configurations (4 CPU, 16 GB memory) is considered as an experimental environment, which monitors 1500 VMs. User interface ("UI") actions were simulated from each user by loading all UI pages and waiting for simultaneously page loading. This provided realistic impact on vR Ops. At times the number of concurrent users was increased and decreased (e.g., 10, 30, 50 and 70 concurrent users). Users counts were used as the business metric for the application. vR Ops' capacity metrics and UI load response time were used the capacity metric. FIG. 16 shows users counts versus time as the business metric. FIG. 17 shows UI load response time (averaged from times for loading different pages) as the capacity metric. FIG. 18 shows burst spikes of corresponding normalized capacity (dashed) and business (solid) metrics. FIG. 18 also shows the intersections of the burst spikes of both capacity and business metrics. Here the quantile $q_k=0.8$ was the quantile that provided the best correlation coefficient of 0.89 between burst spikes. Time windows were selected as have the only point within it as the metrics are rather conservative in terms of variability and smoothing is not needed. FIG. 19 shows that capacity-forecast model obtained using linear regression model for this ex-ample (standard deviation error tem is 0.44). Linear capacity-forecast model lead to an interesting prediction in terms of concurrent users trying to simultaneously load the same pages. The maximum number of concurrent users is 32 if a 5-second page-load time is an acceptable business performance. Assuming that average acceptable time for page loading is 5 seconds, vRealize Operations Management tool provided normal performance. Actual capacity metrics of CPU usage and memory were used. There was no correlation found between the number of concurrent users and these CPU and memory capacity metrics. Therefore, increasing CPU and memory is not the solution to the problem presented in scenario 1.

Scenario 2.

Figure 20:
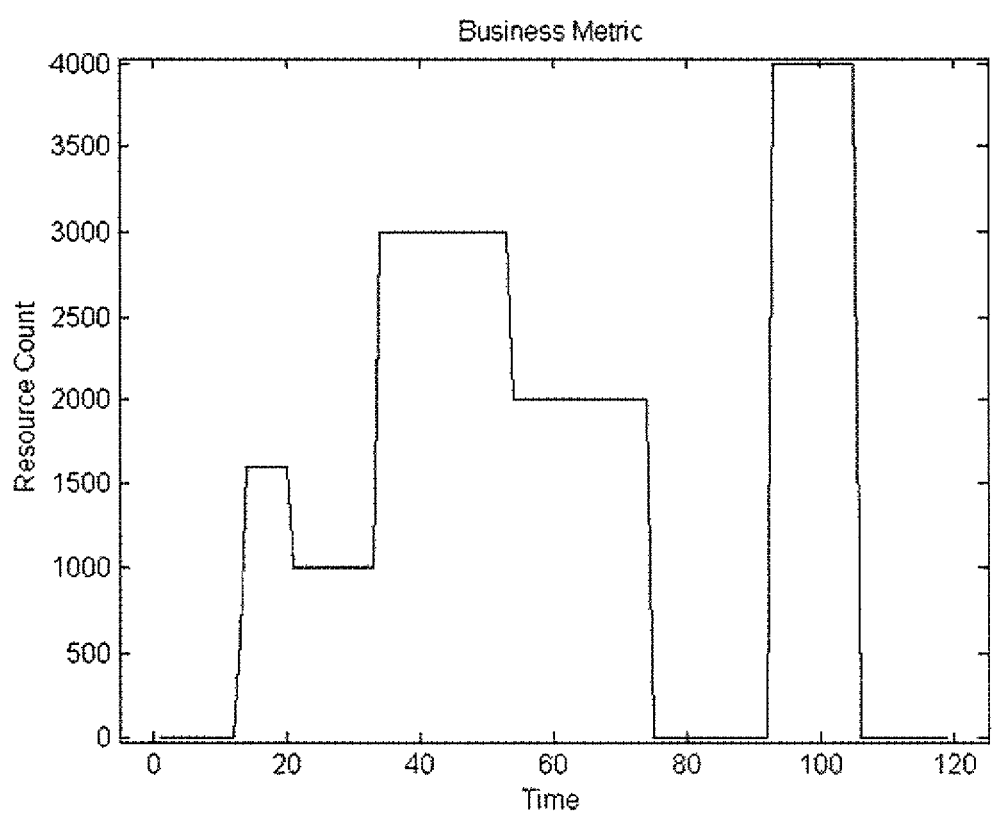
Figure 21:
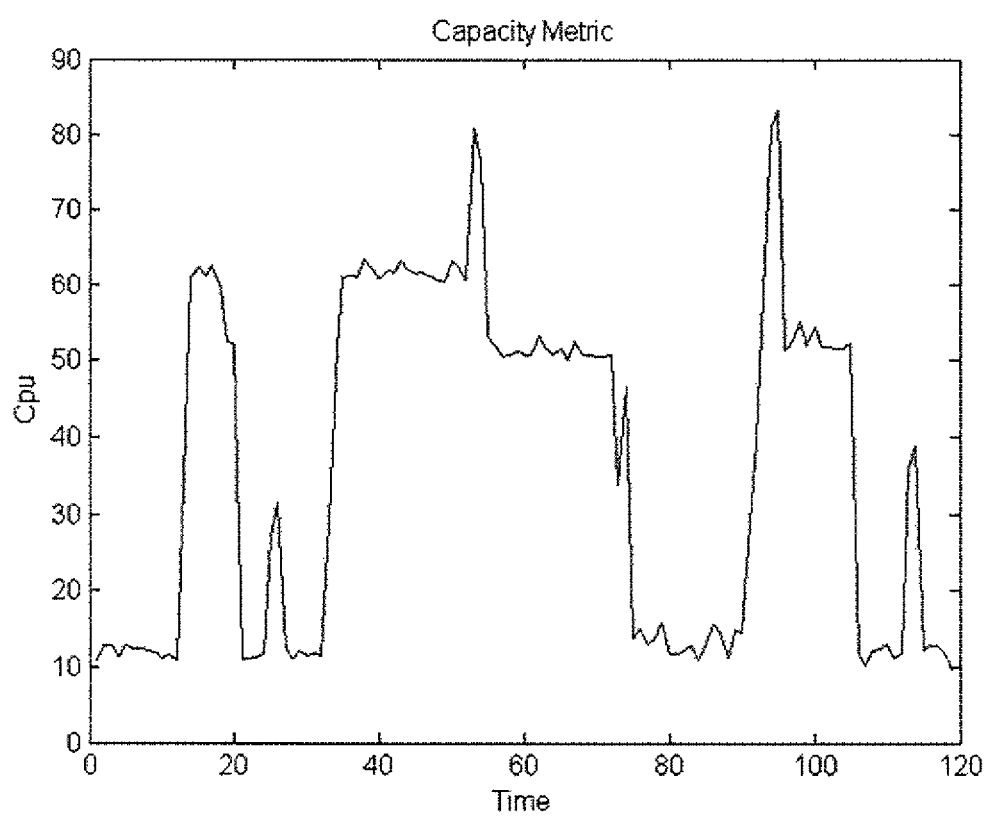
Figure 22:
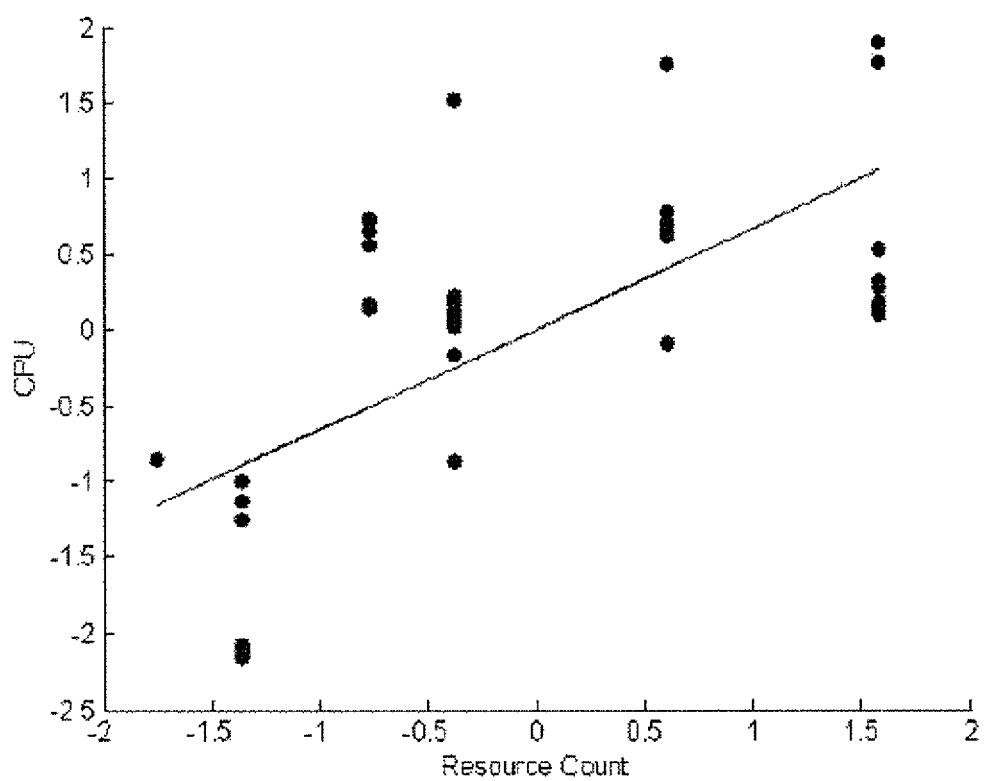
Figure 23:
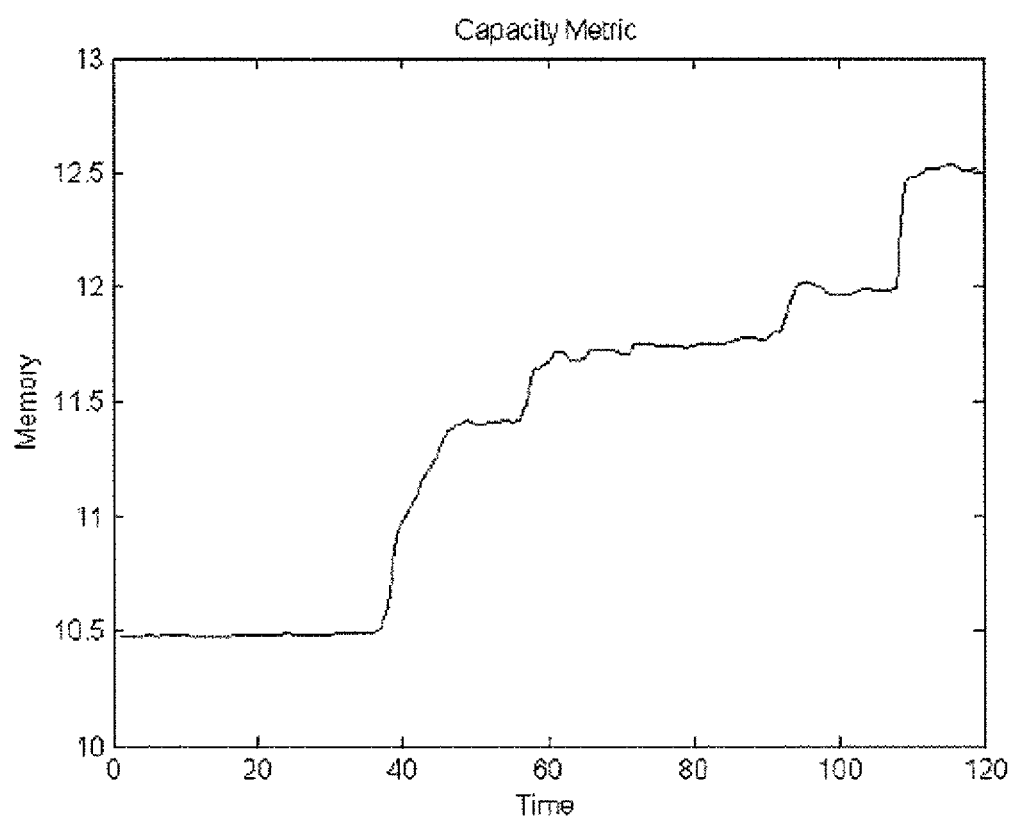
Figure 24:
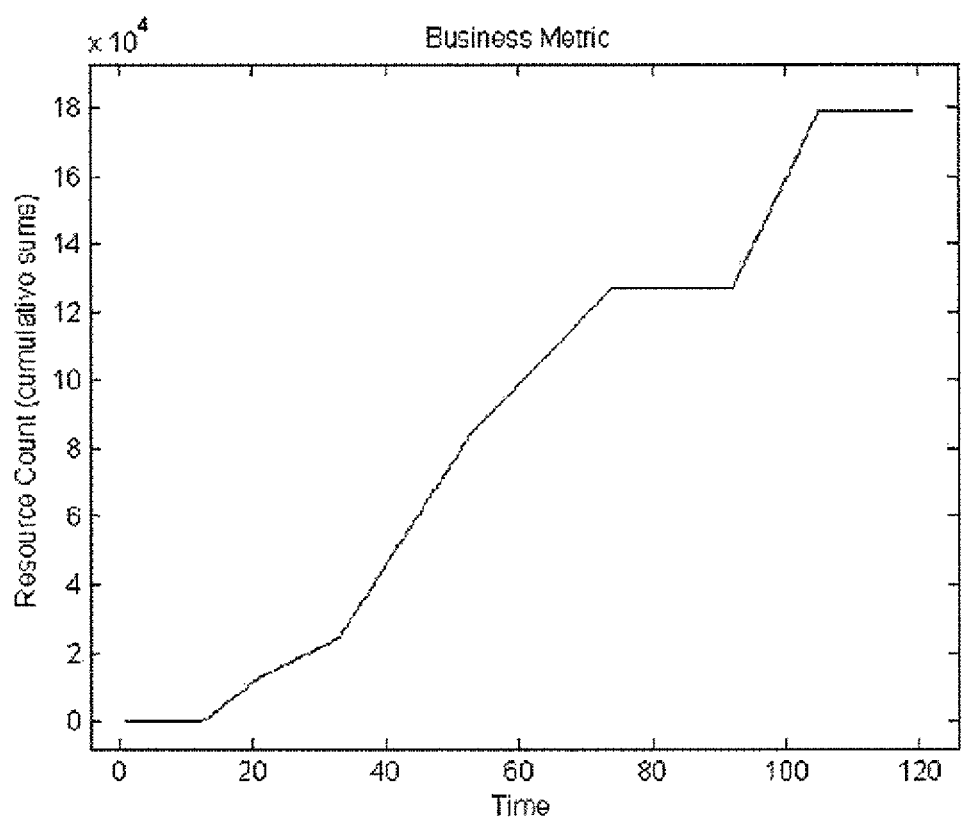
Figure 25:
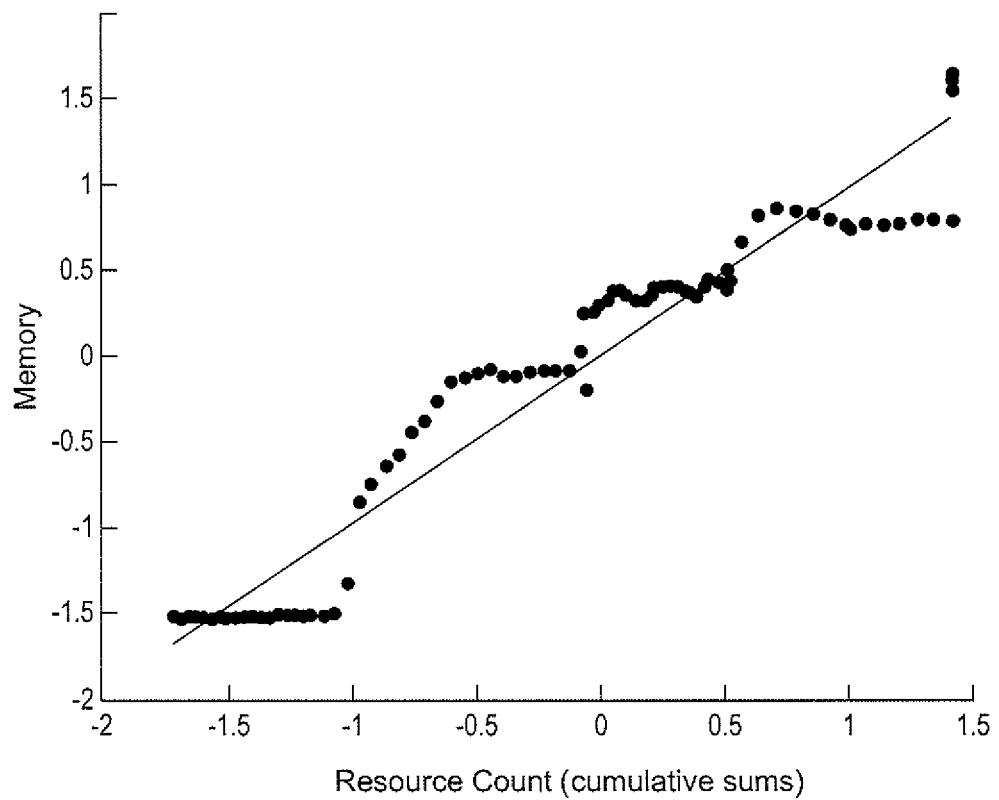

Making a stress on the number of monitored objects. The single node vRealize Operations Management tool with small configurations (4 CPU, 16 GB memory) was considered as the experimental environment. During the experiment the number of monitored objects was stressed (by increasing/decreasing from 1000 to 4000 objects). FIG. 20 shows the resource count as the business metric. FIG. 21 shows the CPU usage as the capacity metric. Correlation coefficient with quantile $q_k=0.3$ was calculate at 0.66. The standard deviation of the error of the linear model shown in FIG. 22 was 0.75. How many resources we can monitor before CPU usage reaches the value of 98% (some threshold)? The answer is: almost 6600 objects. FIG. 22 shows capacity-forecast model obtained by linear regression. FIG. 23 show a plot of the memory metric as the capacity measure in which the number of resources is increased and decreased. The problem is in the vR Ops' architecture, memory keeps these resources in the memory for some period of time before deleting them according to a defined policy. As a result, the right business metric for the analysis is the cumulative sums calculated upon the resources count metric (see FIG. 20). FIG. 24 shows cumulative sums of the resources count metric (see FIG. 5). Correlation coefficient between the metrics in FIGS. 23 and 24 with quantile $q_k$=(correlating almost the entire metrics) is 0.97 with the error of the linear model 0.24 (see FIG. 25). FIG. 25 shows a linear capacity-forecast model for the business metric shown in FIG. 24 and the capacity metric shown in FIG. 23. The number of resources that can be added for monitoring before the memory reached the threshold value of 15G was 569,170 resources.

There are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

It is appreciated that the various implementations described herein are intended to enable any person skilled in the art to make or use the present disclosure. Various modifications to these implementations will be readily apparent to those skilled in the art, and the generic principles defined herein may be applied to other implementations without departing from the spirit or scope of the disclosure. For example, any of a variety of different implementations can be obtained by varying any of many different design and development parameters, including programming language, underlying operating system, modular organization, control structures, data structures, and other such design and development parameters. Thus, the present disclosure is not intended to be limited to the implementations described herein but is to be accorded the widest scope consistent with the principles and novel features disclosed herein.

The invention claimed is:

1. A method stored in one or more data-storage devices and executed using one or more processors to allocate computational resources of a data center, the method comprising:
    collecting capacity metric data and business metric data over a time period;
    calculating average capacity metric value in each time window of the time period with a burst spike of capacity metric data;
    calculating average business metric data in the time windows;
    calculating parameters of a capacity-forecast model based on the average capacity metric data and average business metric data;
    using the capacity-forecast model to compute an estimated capacity metric value of computational resources based on a business projection; and
    allocating computational resources to an application executed in the data center based on the estimated capacity metric value.

2. The method of claim 1 further comprising using the capacity-forecast model to calculate an estimated capacity metric value based on a business metric value.

3. The method of claim 1, wherein calculating the average capacity metric value in each time window further comprises:
    calculating a percentage of capacity metric data greater than a quantile in time windows of the time period;
    identifying time windows in which the percentage is greater than a percentage threshold as having a burst spike of capacity metric data; and
    calculating an average capacity metric value in each of the time windows identified as having a burst spike of capacity metric data.

4. The method of claim 1, wherein calculating average business metric data in the time windows further comprises calculating an average business metric value in each of the time windows identified as having a burst spike of capacity metric data.

5. The method of claim 1, wherein calculating the parameters of the capacity-forecast model further comprises:
    calculating normalized capacity metric data from the average capacity metric data;
    calculating normalized business metric data from the average business metric data;
    calculating a correlation coefficient for the normalized capacity and business metric data; and
    calculating a capacity-forecast model based on the normalized capacity and business metric data when the correlation coefficient is greater than a correlation threshold.

6. The method of claim 5 further comprising:
    calculating a capacity-forecast model error; and
    using the capacity-forecast model when the capacity-forecast model error is the less than a capacity-forecast model threshold.

7. The method of claim 5, wherein in the capacity-forecast model is a linear capacity-forecast model.

8. The method of claim 5, wherein the capacity-forecast model is a nonlinear capacity-forecast model.

9. A system to allocate computational resources of a data center, the system comprising:
    one or more processors;
    one or more data-storage devices; and machine-readable instructions stored in the one or more data-storage devices that when executed using the one or more processors controls the system to carry out collecting capacity metric data and business metric data over a time period;

calculating average capacity metric value in each time window of the time period with a burst spike of capacity metric data;

calculating average business metric data in the time windows;

calculating parameters of a capacity-forecast model based on the average capacity metric data and average business metric data;

using the capacity-forecast model to compute an estimated capacity metric value of computational resources based on a business projection; and allocating computational resources to an application executed in the data center based on the estimated capacity metric value.

10. The system of claim 9 further comprising using the capacity-forecast model to calculate an estimated capacity metric value based on a business metric value.

11. The system of claim 9, wherein calculating the average capacity metric value in each time window further comprises:

calculating a percentage of capacity metric data greater than a quantile in time windows of the time period;

identifying time windows in which the percentage is greater than a percentage threshold as having a burst spike of capacity metric data; and calculating an average capacity metric value in each of the time windows identified as having a burst spike of capacity metric data.

12. The system of claim 9, wherein calculating average business metric data in the time windows further comprises calculating an average business metric value in each of the time windows identified as having a burst spike of capacity metric data.

13. The system of claim 9, wherein calculating the parameters of the capacity-forecast model further comprises:

calculating normalized capacity metric data from the average capacity metric data;

calculating normalized business metric data from the average business metric data;

calculating a correlation coefficient for the normalized capacity and business metric data; and calculating a capacity-forecast model based on the normalized capacity and business metric data when the correlation coefficient is greater than a correlation threshold.

14. The system of claim 13 further comprising:

calculating a capacity-forecast model error; and using the capacity-forecast model when the capacity-forecast model error is the less than a capacity-forecast model threshold.

15. The system of claim 13, wherein i the capacity-forecast model is a linear capacity-forecast model.

16. The system of claim 13, wherein the capacity-forecast model is a nonlinear capacity-forecast model.

17. A non-transitory computer-readable medium encoded with machine-readable instructions that implement a method to allocate computational resources of a data center carried out by one or more processors of a computer system to execute instructions comprising:

collecting capacity metric data and business metric data over a time period;

calculating average capacity metric value in each time window of the time period with a burst spike of capacity metric data;

calculating average business metric data in the time windows;

calculating parameters of a capacity-forecast model based on the average capacity metric data and average business metric data;

using the capacity-forecast model to compute an estimated capacity metric value of computational resources based on a business projection; and allocating computational resources to an application executed in the data center based on the estimated capacity metric value.

18. The medium of claim 17 further comprising using the capacity-forecast model to calculate an estimated capacity metric value based on a business metric value.

19. The medium of claim 17, wherein calculating the average capacity metric value in each time window further comprises:

calculating a percentage of capacity metric data greater than a quantile in time windows of the time period;

identifying time windows in which the percentage is greater than a percentage threshold as having a burst spike of capacity metric data; and calculating an average capacity metric value in each of the time windows identified as having a burst spike of capacity metric data.

20. The medium of claim 17, wherein calculating average business metric data in the time windows further comprises calculating an average business metric value in each of the time windows identified as having a burst spike of capacity metric data.

21. The medium of claim 17, wherein calculating the parameters of the capacity-forecast model further comprises:

calculating normalized capacity metric data from the average capacity metric data;

calculating normalized business metric data from the average business metric data;

calculating a correlation coefficient for the normalized capacity and business metric data; and calculating a capacity-forecast model based on the normalized capacity and business metric data when the correlation coefficient is greater than a correlation threshold.

22. The medium of claim 21 further comprising:

calculating a capacity-forecast model error; and using the capacity-forecast model when the capacity-forecast model error is the less than a capacity-forecast model threshold.

23. The medium of claim 21, wherein i the capacity-forecast model is a linear capacity-forecast model.

24. The medium of claim 21, wherein the capacity-forecast model is a nonlinear capacity-forecast model.

* * * * *